(12) United States Patent
Ge et al.

(10) Patent No.: US 11,945,181 B2
(45) Date of Patent: Apr. 2, 2024

(54) METHOD FOR MAKING PHOTOCHROMIC CONTACT LENSES

(71) Applicant: Alcon Inc., Fribourg (CH)

(72) Inventors: Junhao Ge, Redwood City, CA (US); Yuan Chang, Atlanta, GA (US); Steve Yun Zhang, Sugar Hill, GA (US); Michelle Plavnik, Atlanta, GA (US); Augustine Twum Kumi, Grayson, GA (US); Daqing Wu, Suwanee, GA (US)

(73) Assignee: Alcon Inc., Fribourg (CH)

( * ) Notice: Subject to any disclaimer, the term of this patent is extended or adjusted under 35 U.S.C. 154(b) by 231 days.

(21) Appl. No.: 17/512,431

(22) Filed: Oct. 27, 2021

(65) Prior Publication Data

US 2022/0126541 A1 Apr. 28, 2022

Related U.S. Application Data

(60) Provisional application No. 63/106,397, filed on Oct. 28, 2020.

(51) Int. Cl.
*B29D 11/00* (2006.01)
*C08F 230/08* (2006.01)
(Continued)

(52) U.S. Cl.
CPC .. B29D 11/00653 (2013.01); B29D 11/00076 (2013.01); B29D 11/00134 (2013.01);
(Continued)

(58) Field of Classification Search
CPC ........ B29D 11/00653; B29D 11/00076; B29D 11/00134; C08F 230/08; G02C 7/04; G02C 7/102
See application file for complete search history.

(56) References Cited

U.S. PATENT DOCUMENTS

| 3,100,778 A | 8/1963 | Berman |
| 3,562,172 A | 2/1971 | Ono et al. |

(Continued)

FOREIGN PATENT DOCUMENTS

| FR | 3086660 A1 | 4/2020 |
| TW | I691590 B | 4/2020 |
| WO | 2021/181341 A1 | 9/2021 |

*Primary Examiner* — Mathieu D Vargot
(74) *Attorney, Agent, or Firm* — Jian Zhou

(57) ABSTRACT

Described herein is a method for producing photochromic silicone hydrogel contact lenses in a relatively efficient and consistent manner from a polymerizable composition under a controlled thermal curing scheme. The main polymerizable components in the polymerizable composition are a high radical-reactive hydrophilic (meth)acrylamido monomer, a high radical-reactive siloxane-containing (meth)acrylamido monomer, and a polysiloxane vinylic crosslinker(s) free of low-reactive ethylenically unsaturated group as the main crosslinker. The thermal free radical initiator having a 10 hour half-life temperature ($T_{10h\lambda}$) of from about 50° C. to about 90° C. The controlled thermal curing scheme includes maintaining a first curing temperature of from about $(T_{10h\lambda}-20)°$ C. to about $T_{10h\lambda}°$ C. for a first curing time and maintaining a second curing temperature of from about $(T_{10h\lambda}+10)°$ C. to about $(T_{10h\lambda}+35)°$ C. for a second curing time.

18 Claims, 1 Drawing Sheet

(51) Int. Cl.
*G02C 7/04* (2006.01)
*G02C 7/10* (2006.01)
*B29K 33/00* (2006.01)
*B29K 83/00* (2006.01)
*B29K 105/00* (2006.01)

(52) U.S. Cl.
CPC .............. *C08F 230/08* (2013.01); *G02C 7/04* (2013.01); *G02C 7/102* (2013.01); *B29K 2033/26* (2013.01); *B29K 2083/00* (2013.01); *B29K 2105/0002* (2013.01); *B29K 2105/0061* (2013.01); *B29K 2823/10* (2013.01); *B29K 2995/0046* (2013.01); *B29K 2995/0065* (2013.01)

(56) References Cited

U.S. PATENT DOCUMENTS

| | | |
|---|---|---|
| 3,567,605 A | 3/1971 | Becker |
| 3,578,602 A | 5/1971 | Ono et al. |
| 3,671,543 A | 6/1972 | Koga et al. |
| 4,136,250 A | 1/1979 | Mueller et al. |
| 4,153,641 A | 5/1979 | Deichert et al. |
| 4,182,822 A | 1/1980 | Chang |
| 4,189,546 A | 2/1980 | Deichert et al. |
| 4,215,010 A | 7/1980 | Chu et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,342,668 A | 8/1982 | Hovey et al. |
| 4,343,927 A | 8/1982 | Chang |
| 4,355,147 A | 10/1982 | Deichert et al. |
| 4,440,672 A | 4/1984 | Chu |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,632,844 A | 12/1986 | Yanagihara et al. |
| 4,634,767 A | 1/1987 | Hoelscher et al. |
| 4,636,561 A | 1/1987 | Hosoda |
| 4,637,698 A | 1/1987 | Kwak et al. |
| 4,661,575 A | 4/1987 | Tom |
| 4,681,412 A | 7/1987 | Lemelson |
| 4,684,538 A | 8/1987 | Klemarczyk |
| 4,699,473 A | 10/1987 | Chu |
| 4,703,097 A | 10/1987 | Wingler et al. |
| 4,719,296 A | 1/1988 | Irie et al. |
| 4,720,547 A | 1/1988 | Kwak et al. |
| 4,772,700 A | 9/1988 | Kawauchi et al. |
| 4,784,474 A | 11/1988 | Yamamoto et al. |
| 4,785,097 A | 11/1988 | Kwak |
| 4,816,584 A | 3/1989 | Kwak et al. |
| 4,818,096 A | 4/1989 | Heller et al. |
| 4,826,977 A | 5/1989 | Heller et al. |
| 4,831,142 A | 5/1989 | Kwak |
| 4,833,218 A | 5/1989 | Lee |
| 4,837,289 A | 6/1989 | Mueller et al. |
| 4,880,667 A | 11/1989 | Welch |
| 4,929,693 A | 5/1990 | Akashi et al. |
| 4,931,219 A | 6/1990 | Kwiatkowski et al. |
| 4,931,221 A | 6/1990 | Heller |
| 4,954,586 A | 9/1990 | Toyoshima et al. |
| 4,954,587 A | 9/1990 | Mueller |
| 4,959,471 A | 9/1990 | Melzig |
| 4,980,089 A | 12/1990 | Heller |
| 4,986,934 A | 1/1991 | Kwiatkowski et al. |
| 5,010,141 A | 4/1991 | Mueller |
| 5,034,461 A | 7/1991 | Lai et al. |
| 5,039,761 A | 8/1991 | Ono et al. |
| 5,055,576 A | 10/1991 | Castaldi et al. |
| 5,066,818 A | 11/1991 | Gemert et al. |
| 5,070,170 A | 12/1991 | Robertson et al. |
| 5,070,215 A | 12/1991 | Bambury et al. |
| 5,079,319 A | 1/1992 | Mueller |
| 5,110,922 A | 5/1992 | Castaldi et al. |
| 5,114,621 A | 5/1992 | Guglielmetti et al. |
| 5,139,707 A | 8/1992 | Guglielmetti et al. |
| 5,166,345 A | 11/1992 | Akashi et al. |
| 5,171,636 A | 12/1992 | Castaldi et al. |
| 5,180,524 A | 1/1993 | Casilli et al. |
| 5,186,867 A | 2/1993 | Castaldi et al. |
| 5,200,116 A | 4/1993 | Heller |
| 5,238,931 A | 8/1993 | Yoshikawa et al. |
| 5,238,981 A | 8/1993 | Knowles |
| 5,244,602 A | 9/1993 | Van Gemert |
| 5,274,132 A | 12/1993 | VanGemert |
| 5,340,857 A | 8/1994 | Van Gemert |
| 5,346,946 A | 9/1994 | Yokoyama et al. |
| 5,358,995 A | 10/1994 | Lai et al. |
| 5,369,158 A | 11/1994 | Knowles |
| 5,384,077 A | 1/1995 | Knowles |
| 5,387,632 A | 2/1995 | Lai et al. |
| 5,395,567 A | 3/1995 | Van Gemert et al. |
| 5,399,687 A | 3/1995 | Melzig |
| 5,405,958 A | 4/1995 | VanGemert |
| 5,411,679 A | 5/1995 | Kumar |
| 5,416,132 A | 5/1995 | Yokoyama et al. |
| 5,429,774 A | 7/1995 | Kumar |
| 5,449,729 A | 9/1995 | Lai |
| 5,451,344 A | 9/1995 | Knowles et al. |
| 5,451,617 A | 9/1995 | Lai et al. |
| 5,458,814 A | 10/1995 | Kumar et al. |
| 5,458,815 A | 10/1995 | Knowles |
| 5,464,567 A | 11/1995 | Knowles et al. |
| 5,466,398 A | 11/1995 | Van Gemert et al. |
| 5,486,579 A | 1/1996 | Lai et al. |
| 5,514,817 A | 5/1996 | Knowles |
| 5,520,853 A | 5/1996 | Rickwood et al. |
| 5,552,090 A | 9/1996 | Van Gemert et al. |
| 5,552,091 A | 9/1996 | Kumar |
| 5,565,147 A | 10/1996 | Knowles et al. |
| 5,573,712 A | 11/1996 | Kumar et al. |
| 5,578,252 A | 11/1996 | Van Gemert et al. |
| 5,585,042 A | 12/1996 | Knowles |
| 5,623,005 A | 4/1997 | Rickwood et al. |
| 5,637,262 A | 6/1997 | Van Gemert et al. |
| 5,637,709 A | 6/1997 | Melzig |
| 5,645,767 A | 7/1997 | Van Gemert |
| 5,650,098 A | 7/1997 | Kumar et al. |
| 5,651,923 A | 7/1997 | Kumar et al. |
| 5,656,206 A | 8/1997 | Knowles et al. |
| 5,658,500 A | 8/1997 | Kumar et al. |
| 5,658,501 A | 8/1997 | Kumar et al. |
| 5,674,432 A | 10/1997 | Knowles et al. |
| 5,698,141 A | 12/1997 | Kumar |
| 5,723,072 A | 3/1998 | Kumar |
| 5,728,758 A | 3/1998 | Smith |
| 5,730,908 A | 3/1998 | Nodari et al. |
| 5,744,070 A | 4/1998 | Kumar |
| 5,759,450 A | 6/1998 | Hughes et al. |
| 5,760,100 A | 6/1998 | Nicolson et al. |
| 5,783,116 A | 7/1998 | Lin |
| 5,801,243 A | 9/1998 | Melzig et al. |
| 5,808,063 A | 9/1998 | Kumar |
| 5,811,034 A | 9/1998 | Lin |
| 5,831,090 A | 11/1998 | Paltchkov et al. |
| 5,833,885 A | 11/1998 | Rickwood et al. |
| 5,869,658 A | 2/1999 | Lin et al. |
| 5,879,592 A | 3/1999 | Kumar |
| 5,891,368 A | 4/1999 | Kumar |
| 5,894,002 A | 4/1999 | Boneberger et al. |
| 5,955,520 A | 9/1999 | Heller et al. |
| 5,961,892 A | 10/1999 | Gemert et al. |
| 5,962,548 A | 10/1999 | Vanderlaan et al. |
| 5,981,634 A | 11/1999 | Smith et al. |
| 5,981,675 A | 11/1999 | Valint, Jr. et al. |
| 5,998,520 A | 12/1999 | Krishnan et al. |
| 6,004,486 A | 12/1999 | Chan |

(56) References Cited

U.S. PATENT DOCUMENTS

| | | |
|---|---|---|
| 6,017,121 A | 1/2000 | Chateau et al. |
| 6,018,059 A | 1/2000 | Chan |
| 6,019,914 A | 2/2000 | Lokshin et al. |
| 6,022,495 A | 2/2000 | Kumar |
| 6,022,497 A | 2/2000 | Kumar |
| 6,030,555 A | 2/2000 | Chan |
| 6,034,193 A | 3/2000 | Henry et al. |
| 6,039,913 A | 3/2000 | Hirt et al. |
| 6,065,836 A | 5/2000 | Krishnan et al. |
| 6,106,744 A | 8/2000 | Van Gemert et al. |
| 6,107,395 A | 8/2000 | Rosthauser et al. |
| 6,113,814 A | 9/2000 | Gemert et al. |
| 6,146,554 A | 11/2000 | Melzig et al. |
| 6,149,841 A | 11/2000 | Kumar |
| 6,153,126 A | 11/2000 | Kumar |
| 6,166,236 A | 12/2000 | Bambury et al. |
| 6,174,464 B1 | 1/2001 | Garrity |
| 6,221,284 B1 | 4/2001 | Florent et al. |
| 6,224,945 B1 | 5/2001 | Calderara |
| 6,248,264 B1 | 6/2001 | Clarke et al. |
| 6,296,785 B1 | 10/2001 | Nelson et al. |
| 6,315,928 B1 | 11/2001 | Mann et al. |
| 6,342,459 B1 | 1/2002 | Melzig et al. |
| 6,348,604 B1 | 2/2002 | Nelson et al. |
| 6,353,102 B1 | 3/2002 | Kumar |
| 6,367,929 B1 | 4/2002 | Maiden et al. |
| 6,414,057 B1 | 7/2002 | Crisci et al. |
| 6,451,871 B1 | 9/2002 | Winterton et al. |
| 6,478,988 B1 | 11/2002 | Hughes et al. |
| 6,630,597 B1 | 10/2003 | Lin et al. |
| 6,719,929 B2 | 4/2004 | Winterton et al. |
| 6,762,264 B2 | 7/2004 | Kunzler et al. |
| 6,793,973 B2 | 9/2004 | Winterton et al. |
| 6,811,805 B2 | 11/2004 | Gilliard et al. |
| 6,822,016 B2 | 11/2004 | McCabe et al. |
| 6,867,245 B2 | 3/2005 | Iwata et al. |
| 6,896,926 B2 | 5/2005 | Qiu et al. |
| 7,214,809 B2 | 5/2007 | Zanini et al. |
| 7,261,844 B2 | 8/2007 | Tanikawa et al. |
| 7,368,072 B2 | 5/2008 | Gemert et al. |
| 7,423,074 B2 | 9/2008 | Lai et al. |
| 7,556,750 B2 | 7/2009 | Xiao et al. |
| 7,560,056 B2 | 7/2009 | Van Gemert et al. |
| 7,584,630 B2 | 9/2009 | Van Gemert |
| 7,641,337 B2 | 1/2010 | Altmann |
| 7,858,000 B2 | 12/2010 | Winterton |
| 7,999,989 B2 | 8/2011 | Asai et al. |
| 8,147,897 B2 | 4/2012 | Ferreiro et al. |
| 8,158,037 B2 | 4/2012 | Chopra et al. |
| 8,163,206 B2 | 4/2012 | Chang et al. |
| 8,409,599 B2 | 4/2013 | Wu et al. |
| 8,415,405 B2 | 4/2013 | Maggio et al. |
| 8,475,529 B2 | 7/2013 | Clarke |
| 8,480,227 B2 | 7/2013 | Qiu et al. |
| 8,529,057 B2 | 9/2013 | Qiu et al. |
| 8,557,334 B2 | 10/2013 | Samuel et al. |
| 8,614,261 B2 | 12/2013 | Iwata et al. |
| 8,658,748 B2 | 2/2014 | Liu et al. |
| 8,697,770 B2 | 4/2014 | Duis et al. |
| 8,698,117 B2 | 4/2014 | He et al. |
| 8,741,188 B2 | 6/2014 | Chopra et al. |
| 8,835,525 B2 | 9/2014 | Kuyu et al. |
| 8,993,651 B2 | 3/2015 | Chang et al. |
| 9,028,728 B2 | 5/2015 | Bancroft et al. |
| 9,029,532 B2 | 5/2015 | Dabideen et al. |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,187,601 B2 | 11/2015 | Huang et al. |
| 9,217,813 B2 | 12/2015 | Liu et al. |
| 9,315,669 B2 | 4/2016 | Holland et al. |
| 9,377,569 B2 | 6/2016 | Ishak et al. |
| 9,465,234 B2 | 10/2016 | Chopra et al. |
| 9,475,827 B2 | 10/2016 | Chang et al. |
| 9,487,499 B2 | 11/2016 | He et al. |
| 9,505,184 B2 | 11/2016 | Kolluru et al. |
| 9,904,074 B2 | 2/2018 | Duis et al. |
| 10,081,697 B2 | 9/2018 | Huang et al. |
| 10,197,707 B2 | 2/2019 | Xiao et al. |
| 10,301,451 B2 | 5/2019 | Jing et al. |
| 10,465,047 B2 | 11/2019 | Jing et al. |
| 10,501,446 B2 | 12/2019 | He et al. |
| 10,502,998 B2 | 12/2019 | Xu et al. |
| 10,532,997 B2 | 1/2020 | He et al. |
| 11,168,223 B2 | 11/2021 | Phan et al. |
| 2005/0258408 A1* | 11/2005 | Molock .................. G02C 7/102<br>252/586 |
| 2014/0171539 A1* | 6/2014 | Chang .................. C07F 7/0838<br>556/419 |
| 2020/0307130 A1 | 10/2020 | Aitken et al. |
| 2021/0332174 A1 | 10/2021 | Stumbe et al. |

* cited by examiner

METHOD FOR MAKING PHOTOCHROMIC CONTACT LENSES

This application claims the benefit under 35 USC § 119 (e) of U.S. provisional application No. 63/106,397 filed 28 Oct. 2020, incorporated by reference in its entirety.

This invention is related to a method for producing photochromic contact lenses, in particular, preferably photochromic silicone hydrogel contact lenses, capable of undergoing a reversible color change upon exposure to UV-irradiation or high-energy-violet light (HEVL) (with wavelengths from 380 nm to 440 nm). This invention also provides photochromic contact lenses or more preferably photochromic silicone hydrogel contact lenses made according to a method of the invention.

BACKGROUND

Conventionally, UV-absorbing compounds have been incorporated into contact lenses to make UV-absorbing contact lenses to protect eyes from UV-radiations. Recently, various photochromic contact lenses have been proposed for protecting eyes from UV-radiations (see, e.g., U.S. Pat. Nos. 4,681,412, 6,017,121, 6,174,464, 6,224,945, 7,261,844, 7,368,072, 7,556,750, 7,560,056, 7,584,630, 7,641,337, 7,999,989, 8,158,037, 8,697,770, 8,741,188, 9,052,438, 9,097,916, 9,377,569, 9,465,234, 9,904,074, 10,197,707). Those proposed photochromic contact lenses contains photochromic compounds which are capable of undergoing a reversible color change, e.g., from "clear" to blue or other color, upon exposure to UV/HEVL irradiation.

One approach for incorporating a photochromic compound into contact lenses is to add a polymerizable photochromic compound in a polymerizable composition (i.e., lens formulation) for forming the contact lenses and then to use the obtained lens formulation to produce photochromic contact lenses according to a conventional cast-molding lens manufacturing process. Typically, a conventional cast-molding lens manufacturing process comprises: curing (polymerizing) of a polymerizable composition (lens formulation) within disposable plastic molds typically consisting of two mold halves; opening molds; optionally but preferably delensing (i.e., removing cast-molded lenses from the molds); and being subjected to various post-molding processes including extraction, hydration, surface treatment, packaging, and sterilization, etc.

However, there are challenges in producing photochromic contact lenses from a lens formulation including a polymerizable or non-polymerizable photochromic compound according to such a conventional cast-molding lens manufacturing process. It is known that photochromic compounds can be sensitive to free radicals formed during the curing (polymerization) of a lens formulation. Under the effect of these free radicals, photochromic compounds are susceptible to degradation (decomposition) to generate colored by-products and lose their photoactivity (i.e., photochromic capability), or to interfere radical polymerization of a lens formulation, especially when the lens formulation is cured thermally for a relatively long curing time. Such effects could adversely affect the lens properties, dimensions and processability (e.g., dry-delensing ability) of cast-molded lenses as well as the photochromic capability.

Therefore, there is still a need for a process for producing photochromic contact lenses, in particular, photochromic silicone hydrogel contact lenses having a desired lens properties and processability according to a conventional cast-molding technique.

SUMMARY OF THE INVENTION

The invention provides a method for producing photochromic contact lenses, the method comprising the steps of:
(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
(2) introducing a polymerizable composition into the cavity, wherein the polymerizable composition comprises (a) at least one hydrophilic (meth)acrylamido monomer, (b) at least one siloxane-containing (meth)acrylamido monomer, (c) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonylamino groups, vinyloxycarbonyloxy groups, or combinations thereof, (d) at least one photochromic compound, (e) at least one thermal free radical initiator having a 10-hour half-life temperature (designated as "$T_{10h\lambda}$") of from about 50° C. to about 90° C., and (f) from about 4% to about 20% by weight of an organic solvent relative to the total weight of the polymerizable composition, wherein the sum of the amounts of components (a) to (c) is at least 90% by weight relative to total amount of all polymerizable components in the polymerizable composition;
(3) curing thermally the polymerizable composition in the lens mold in an oven to form an unprocessed photochromic silicone hydrogel lens precursor, wherein the step of curing thermally comprises (a) maintaining a first curing temperature of from about $(T_{10h\lambda}-20)°$ C. to about $T_{10h\lambda}°$ C. for a first curing time, (b) maintaining a second curing temperature of from about $(T_{10h\lambda}+10)°$ C. to about $(T_{10h\lambda}+35)°$ C. for a second curing time, and (c) optionally maintaining a third curing temperature of about 100° C. for a third curing time; and
(4) subjecting the unprocessed photochromic silicone hydrogel lens precursor to one or more post-molding processes selected from the group consisting of extraction, surface treatment, hydration, packaging, sterilization, and combinations thereof, to form a photochromic silicone hydrogel contact lens.

The invention provides in another aspect photochromic contact lenses obtained according to a method of the invention.

BRIEF DESCRIPTIONS OF THE DRAWINGS

DETAILED DESCRIPTION

Figure 1:
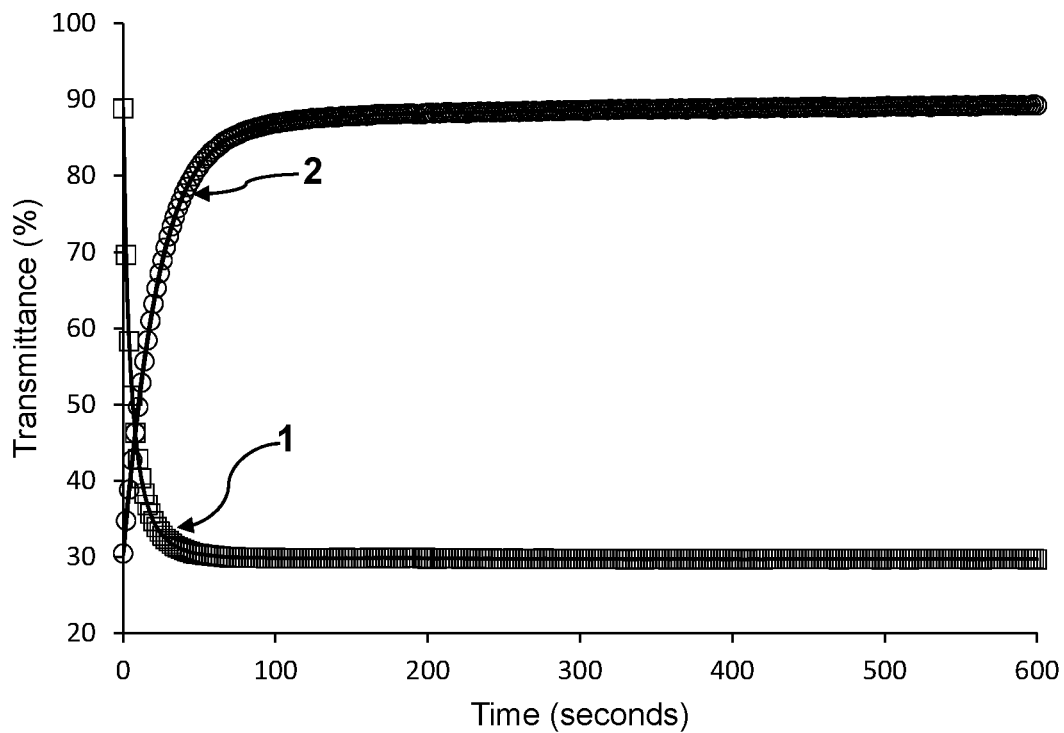
FIG. 1 shows kinetics studies at room temperature (absorption at 550 nm) of a photochromic SiHy contact lens: Curve 1—activating; and Curve 2—fading (deactivating).

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" or "SiHy contact lens" refers to a contact lens comprising a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.5% by weight at room temperature (i.e., a temperature of from 21° C. to 27° C.).

The term "insoluble", in reference to a compound or material in a solvent, means that the compound or material can be dissolved in the solvent to give a solution with a concentration of less than 0.01% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

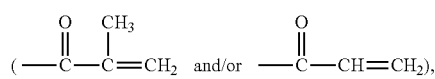

vinyloxycarbonylamino

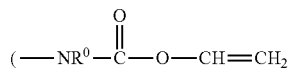

in which $R^o$ is H or $C_1$-$C_4$ alkyl), vinyloxycarbonyloxy

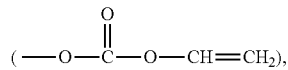

ally vinyl styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, e.g., UV/visible light irradiation, or the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

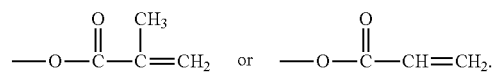

An "(meth)acrylamido monomer" refers to a vinylic monomer having one sole group of

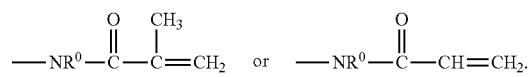

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

The term "ene group" refers to a monovalent radical of $CH_2$=CH— or $CH_2$=$CCH_3$— that is not covalently attached to an oxygen or nitrogen atom or a carbonyl group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A siloxane, which often also described as a silicone, refers to a molecule having at least one moiety of —Si—O—Si— where each Si atom carries two organic groups as substituents.

A "polysiloxane segment" or "polydiorganosiloxane segment" interchangeably refers to a polymer chain segment (i.e., a divalent radical) of

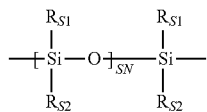

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{13}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and a photochromic organic radical having a photochromic group.

A "polydiorganosiloxane vinylic monomer" or "polysiloxane vinylic monomer" interchangeably refers to a compound comprising at least one polysiloxane segment and one sole ethylenically-unsaturated groups.

A "polydiorganosiloxane vinylic crosslinker" or "polysiloxane vinylic crosslinker" interchangeably refers to a compound comprising at least one polysiloxane segment and at least two ethylenically-unsaturated groups.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "photochromic compound" refers to a compound that has one colorless (or light-colored) form and one colored form and can undergo reversible change from the colorless form (or light-colored form) (or so-called "deactivated form") to the colored form (or so-called "activated form") upon exposure to UV or HEVL irradiation.

The term "colorless or light-colored stated" or "inactivated state" in reference to a photochromic contact lens means the original state of the photochromic contact lens before the photochromic contact lens is irradiated with UV and/or HEVL. In this state, the photochromic contact lens typically is colorless or shows a faint color as observed by a naked eye.

The term "colored stated" or "activated state" in reference to a photochromic contact lens means a state of the photochromic contact lens when the photochromic contact lens is being irradiated with UV and/or HEVL. In this state, the photochromic contact lens typically shows a dark color as observed by a naked eye.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

A "thermal free radical initiator" refers to a chemical that initiates radical crosslinking/polymerizing reaction by the use of heat energy.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "terminal ethylenically-unsaturated group" refers to one ethylenically-unsaturated group at one of the two ends of the main chain (or backbone) of an organic compound as known to a person skilled in the art.

"Post-curing surface treatment", in reference to a SiHy lens bulk material or a SiHy contact lens, means a surface treatment process that is performed after the SiHy lens bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a SiHy contact lens or a SiHy lens bulk material as well known to a person skilled in the art.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "HEVL-absorbing vinylic monomer" refers to a compound comprising an ethylenically-unsaturated group and a HEVL-absorbing moiety which can absorb or screen out HEVL (high-energy-violet-light) radiation in the range from 380 nm to 440 nm as understood by a person skilled in the art.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula.

UVA % $T$=Average % Transmission between 315 nm and 380 nm×100

UVB % $T$=Average % Transmission between 280 nm and 315 nm×100

Violet % $T$=Average % Transmission between 380 nm and 440 nm×100

A "10-hour half-life temperature" in reference to a thermal free radical initiator means a temperature at which 10 hours is required to reduce the original initiator content of a solution by 50%. In accordance with the invention, the 10-hour half-life temperature of a thermal free radical initiator is the value published by the manufacturer. It is understood that it can also be determined experimentally as known to a person skilled in the art.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as [($cm^3$ oxygen)(cm)/($cm^2$)(sec)(mm Hg)]×$10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [($cm^3$ oxygen)/($cm^2$)(sec)(mm Hg)]×$10^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a SiHy material or a contact lens means that the SiHy material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

In general, the invention is directed to a method for producing photochromic silicone hydrogel (SiHy) contact lenses in a relatively efficient and consistent manner from a lens formulation (i.e., a polymerizable composition) of the invention under a controlled thermal curing scheme.

A polymerizable composition of the invention is formulated to use relatively-high radical-reactive hydrophilic and hydrophobic (meth)acrylamido monomers and polysiloxane vinylic crosslinker(s) as main polymerizable components. A method of the invention is characterized by selecting and using high radical-reactive (meth)acrylamido monomers almost exclusively as vinylic monomers in a lens formulation (polymerizable composition), by using a polysiloxane vinylic crosslinker free of low radical-reactive ethylenically unsaturated groups as the main crosslinker in a lens formulation, and by controlling the thermal curing process through the stage-wise curing scheme in combination with the selective use of a thermal initiator, to control the concentration of free radicals generated in a temporarily controllable manner to preferentially facilitate the polymerization of the main polymerizable components in the polymerizable composition through the temporally-controlled generation of free radicals for initiating the polymerization while minimizing the free radical-induced degradation of photochromic compound. The desired lens properties (e.g., water content, elastic modulus, etc.) and lens processability (capability of dry-delensing from molds) of thermally cast-molded SiHy contact lenses can be consistently achieved by following the method of the invention.

The present invention provides a method for producing photochromic contact lenses, the method comprising the steps of:

(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

(2) introducing a polymerizable composition into the cavity, wherein the polymerizable composition comprises (a) at least one hydrophilic (meth)acrylamido monomer, (b) at least one siloxane-containing (meth)acrylamido monomer, (c) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonylamino groups, vinyloxycarbonyloxy groups, or combinations thereof, (d) at least one photochromic compound, (e) at least one thermal free radical initiator having a 10-hour half-life temperature (designated as $T_{10h\lambda}$) of from about 50° C. to about 90° C., and (f) from about 4% to about 20% by weight (preferably 5% to about 17%, more preferably from about 6% to about 15%, even more preferably from about 6% to about 13% by weight) of an organic solvent relative to the total weight of the polymerizable composition, wherein the sum of the amounts of components (a) to (c) is at least 90% by weight (preferably at least 92% by weight, more preferably at least 94% by weight) relative to total amount of all polymerizable components in the polymerizable composition;

(3) curing thermally the polymerizable composition in the lens mold in an oven to form an unprocessed photochromic silicone hydrogel lens precursor, wherein the step of curing thermally comprises (a) maintaining a first curing temperature of from about $(T_{10h\lambda}-20)°$ C. to about $T_{10h\lambda}°$ C. for a first curing time, (b) maintaining a second curing temperature of from about $(T_{10h\lambda}+10)°$ C. to about $(T_{10h\lambda}+35)°$ C. for a second curing time, and (c) optionally maintaining a third curing temperature of about 100° C. for a third curing time; and (4) subjecting the unprocessed photochromic silicone hydrogel lens precursor to one or more post-molding processes selected from the group consisting of extraction, surface treatment, hydration, packaging, sterilization, and combinations thereof, to form a photochromic silicone hydrogel contact lens.

Lens molds for making contact lenses including SiHy contact lenses are well known to a person skilled in the art and, for example, employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,446; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, any hydrophilic (meth)acrylamido monomers can be in this invention. Examples of preferred hydrophilic (meth)acrylamido monomers are described later in this application. It is understood that any hydrophilic (meth)acrylamido monomers other than those specifically described later in this application can also be used in this invention.

Any siloxane-containing (meth)acrylamido monomers can be used in the invention. Preferably, siloxane-containing (meth)acrylamido monomers are those (meth)acrylamido monomers each of which comprises a bis(trialkylsilyloxy)alkylsilyl group, a tris(trialkylsilyloxy)-silyl group, or a polysiloxane chain having 3 to 30 siloxane units and terminated with an alkyl, hydroxyalkyl or methoxyalkyl group, as described later in this application. Such preferred siloxane-containing (meth)acrylamido monomers can be obtained from the commercial suppliers, or alternatively prepared according to known procedures, e.g., similar to those described in U.S. Pat. No. 9,315,669.

In accordance with the invention, any polysiloxane vinylic crosslinkers can be used in this invention so long as all the ethylenically unsaturated groups of the polysiloxane vinylic crosslinker are (meth)acrylamido groups, (meth)acryloxy groups, vinyloxycarbonyloxy groups, vinyloxycarbonylamino groups, or combinations thereof. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyloxycarbonyloxy-terminated polydimethylsiloxanes of various molecular weight; α,ω-vinyloxycarbonylamino-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyl-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. patent Ser. No. 10/081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydisiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

Any photochromic compounds can be used in the invention. Various photochromic compounds are disclosed in the patents and published patent applications and can be obtained from commercial sources or prepared by following the procedures described in the patents and literatures. Examples of preferred photochromic compounds include without limitation naphthopyrans, indeno-fused naphthopyrans (i.e., indeno-naphthopyrans), heterocyclic ring-fused naphthopyrians, benzopyrans, phenanthropyrans, quinolinopyrans, quinolinopyrans, fluoroanthenopyrans, anthracene-fused pyrans, tetracene-fused pyrans, spiro(benzindoline)-naphthopyrans, spiro(indoline)naphthopyrans, spiro (indoline)benzopyrans, spiro(indoline)-quinopyrans, spiro (indoline)pyrans, naphthoxazines, spirobenzopyrans, spirobenzothiopyrans, naphthacenediones, benzoxazines, spirooxazines, naphthoxazines, spiro(benzindoline)-naphthoxazines, spiro(indoline)naphthoxazines, spiro(indoline) pyrido-benzoxazines, spiro(indoline) benzoxazines, spiro (benzindoline)benzoxazines, spiro(benzindoline)-pyridobenzoxazines, spiro(indoline)fluoranthenoxazines, spiro(indoline)-quinoxazines, spiropiperidine-naphthopyrans, piro(indoline)pyronobenzoxazinones, benzospiropyrans, naphthospiropyrans, spirobenzoxazine-pyrrolopyridines, spironaphthoxazine-pyrrolopyrridines, spiro-oxazepin-benzoxazines, spiro-oxazepin-naphthoxazines, spiro(indoline)-benzothiazoloxazines, spiro(indoline)benzopyrroloxazines, spiro(indoline)quinazolino-oxazines, spiro (indoline)-anthracenobenzoxazines, benzofurobenzopyrans, benzothienobenzopyrans, naphthofurobenzopyrans, benzopyrano-fused naphthopyrans, spiro(isoindoline)-naphthoxazines, spiro(isoindoline)benzoxazines, etc. Such photochromic compounds are disclosed in U.S. Pat. Nos. 3,100,778, 3,562,172, 3,567,605, 3,578,602, 3,671,543, 4,215,010, 4,342,668, 4,440,672, 4,634,767, 4,636,561, 4,637,698, 4,699,473, 4,719,296, 4,720,547, 4,772,700, 4,784,474, 4,785,097, 4,816,584, 4,818,096, 4,826,977, 4,831,142, 4,880,667, 4,929,693, 4,931,219, 4,931,221, 4,959,471, 4,980,089, 4,986,934, 5,055,576, 5,066,818, 5,110,922, 5,114,621, 5,139,707, 5,166,345, 5,171,636, 5,180,524, 5,186,867, 5,200,116, 5,238,931, 5,238,981, 5,244,602, 5,274,132; 5,340,857, 5,369,158, 5,384,077, 5,395,567, 5,399,687, 5,405,958, 5,411,679, 5,429,774, 5,451,344, 5,458,814; 5,458,815, 5,464,567, 5,466,398, 5,514,817; 5,520,853, 5,552,090, 5,552,091, 5,565,147, 5,573,712; 5,578,252, 5,585,042, 5,623,005, 5,637,262, 5,637,709, 5,645,767; 5,650,098, 5,651,923, 5,656,206; 5,658,500, 5,658,501, 5,674,432, 5,698,141, 5,723,072, 5,728,758, 5,730,908, 5,744,070, 5,759,450, 5,783,116, 5,801,243, 5,808,063, 5,811,034, 5,831,090, 5,833,885, 5,869,658; 5,879,592, 5,891,368, 5,955,520; 5,961,892; 5,981,634, 5,998,520, 6,004,486, 6,017,121, 6,018,059; 6,019,914, 6,022,495, 6,022,497; 6,030,555, 6,034,193, 6,065,836, 6,106,744, 6,106,744, 6,107,395, 6,113,814, 6,146,554; 6,149,841, 6,153,126, 6,221,284, 6,248,264; 6,296,785, 6,315,928; 6,342,459; 6,348,604, 6,353,102, 6,414,057, 6,478,858, 6,630,597, 7,556,750, 7,584,630, 7,999,989, 8,158,037, 8,697,770, 8,698,117, 8,741,188, 9,029,532, 9,028,728, 9,052,438, 9,097,916, 9,465,234, 9,487,499, 9,904,074, 10,197,707, 10,501,446, 10,532,997, and 10,502,998 and are also described in the texts, Techniques in Chemistry, Volume III. "Photochromism", Chapter 3 (Glenn H. Brown, Editor, John Wiley and Sons, Inc., New York, 1971) and in "Chromic Phenomena: Technological Applications of Colour Chemistry" (P. Bamfield, RSC Books (2001)). Derivatives of these compounds that include various Substituents can be Synthesized from this teaching by people skilled in the art.

In a preferred embodiment, a polymerizable photochromic compound is used in the invention. Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)-pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929, 693, 5,166,345 6,017,121, 7,556,750, 7,584,630, 7,999,989, 8,158,037, 8,697,770, 8,741,188, 9,052,438, 9,097,916, 9,465,234, 9,904,074, 1,019,7707, 6,019,914, 6,113,814, 6,149,841, 6,296,785, and 6,348,604.

Alternatively, a polymerizable photochromic compound can be obtained by reacting a reactive (meth)acrylamido or (meth)acryloxy monomer having a first reactive functional group (—COCl, —COBr, —COOH, —NHR$_{N2}$, —NCO, —OH, —CHO,

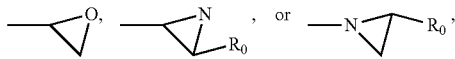

in which R$_0$ is hydrogen or methyl and R$_{N2}$ is hydrogen, a linear or branched C$_1$-C$_{15}$ alkyl, cyclohexyl, cyclopentyl, a substituted or unsubstituted phenyl, or a substituted- or unsubstituted-phenyl-C$_1$-C$_6$ alkyl) with a reactive photochromic compound having a second reactive functional group (—COOH, —NHR$_{N2}$,

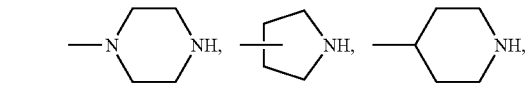

—NCO, —OH, —SH, —CHO,

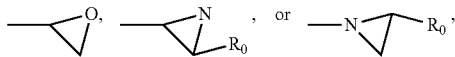

in the or presence of a coupling agent (i.e., having two of the reactive functional groups listed above) under well known coupling reaction conditions, to form a photochromic compound.

Non-limiting examples of coupling reactions under various reaction conditions between a pair of matching co-reactive functional groups selected from the group preferably consisting of primary group, secondary amino group, hydroxyl group, carboxyl group, acid anhydride group, aldehyde group, isocyanate group, epoxy group, aziridine group, azlactone group and thiol group, are given below for illustrative purposes. A primary/secondary amino group reacts with aldehyde or ketone group to form a Schiff base which may further be reduced into an amine bond; a primary/secondary amino group —NHR (in which R is hydrogen or C$_1$-C$_6$ alkyl) reacts with an acid chloride or bromide group or with an acid anhydride group to form an amide linkage (—CO—NR—); an amino group —NHR reacts with a N-hydroxysuccinimide ester group to form an amide linkage; an amino group —NHR reacts with a carboxylic acid group in the presence of a coupling agent—carbodiimide (e.g., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropylcarbodiimide, or mixtures thereof) and N-hydroxysuccinimide to form an amide linkage; an amino group —NHR reacts (ring-opening) with an azlactone group to form an alkylene-diamido linkage (—CONH-CT$_1$T$_2$-(CH$_2$)$_{p1}$—CONH—); an amino group —NHR reacts with an isocyanate group to form a urea linkage (—NR—C(O)—NH— with R as defined above); an amino group —NHR reacts with an epoxy or aziridine group to form an amine bond (—C—NR—); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; a carboxyl group reacts with an epoxy group to form an ester bond; a thiol group (—SH) reacts with an isocyanate to form a linkage of —N—C(O)—S—; a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage of —CONH-CT$_1$T$_2$-(CH$_2$)$_{p1}$—CO—S—; a thiol group reacts with an ene group or vinylsulfonyl group based on thiol-ene "click" reaction under thiol-ene reaction conditions to form a thioether linkage (—S—); a thiol group reacts with a (meth)acryloyl group based on Michael Addition under appropriate reaction conditions to form a thioether linkage.

The reactions conditions for the above described coupling reactions are taught in textbooks and are well known to a person skilled in the art.

In accordance with the invention, coupling agents, each of which has two reactive functional groups, may be used in the coupling reactions. A coupling agent having two reactive functional groups can be: a diisocyanate compound; a di-acid halide compound; a di-carboxylic acid compound; a di-carboxylic acid anhydride compound; a diamine compound; a diol compound; a di-epoxy compound; a di-aziridine compound; di-azlactone compound; a di-ene compound; a divinylsulfone compound; a di-thiol compound; a thiolactone compound; an aminoacid compound; a hydroxy-containing amine compound; an amine compound having one hydroxyl or ketone group; a hydroxy-containing carboxylic acid compound; a mercaptane having a hydroxyl, carboxyl or amino group.

For example, a diisocyanate, di-carboxylic acid (preferably a di-carboxylic acid anhydride), di-aziridine, di-epoxy, or di-azlactone compound can be used in the coupling of the first and second reactive functional groups when they are different or same and are selected from the group consisting of hydroxyl, primary amino, secondary amino, and thiol groups; a di-amine, di-hydroxyl, di-thiol, hydroxy-containing amine, or hydroxy-containing thiol compound can be used in the coupling of the first and second reactive functional groups when they are different or same and are selected from the group consisting of isocyanate, epoxy, aziridine, and carboxylic acid groups; a di-epoxy compound can be used in the coupling of the first and second reactive functional groups when they both are carboxylic acid groups; a di-amine compound can be used in the coupling of the first and second reactive functional groups when they both are aldehyde groups. A person skilled in the art knows well how to select one or more coupling agents, based on selectivity and/or differential reactivity of a given reactive functional group, to link the first and second reactive functional groups to form a polymerizable photochromic compound of the invention.

Examples of commercially available di-carboxylic acid anhydrides include without limitation succinic acid anhydride, methylsuccinic anhydride, 2,2-dimethylsuccinic anhydride, 2,3-dimethylsuccinic acid, glutaric acid anhydride, 3,3-dimethylglutaric anhydride, 2,2-dimethylglutaric anhydride, 3-methylglutaric anhydride, 3,3-tetramethylglutaric anhydride, diglycolic anhydride, adipic anhydride, etc.

Any suitable $C_3$-$C_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or araliphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-biphenyldicarboxylic acid, 2,2'-biphenyl-dicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)methane.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable diamines can be used in the invention. An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, N-methyl-1,3-diamino-propane, N-methylethylenediamine, N-ethylethylenediamine, N-isopropyl-1,3-propanediamine, N-propyl-1,3-propanediamine, N-butylethylenediamine, 2,2-dimethyl-1,3-propanediamine, 1,4-butanediamine, 1,5-pentanediamine, hexamethylenediamine, 2-Methyl-1,5-pentanediamine, 1,6-hexamethylenediamine, N,N'-dimethyl-1,6-hexamethylenediamine, 2,2,4 (2,4,4)-trimethyl-1,6-hexanediamine, 1,3-diamino-2-propanol, 1,2-diaminoethane-1,2-diol, 1,1-diaminoethane-1,2-diol, 1,4-diamino-2,3-butanediol, 1,3-cyclopentanediamine, 1,4-diaminocyclohexane, 1,3-Bis(aminomethyl)cyclohexane, 4,4'-diaminodicyclohexylmethane, 4,4'-methylenebis(2-methylcyclohexylamine), isophorone diamine (3-aminomethyl-3,5,5-trimethylcyclohexylamine), m-xylylene diamine, p-xylylene diamine, piperazine, 1-(2-aminoethyl)piperazine, 1,4-bis(3-amino-propyl)piperazine, 2-piperazinoethylamine, 1-Boc-piperazine, 4-(2-aminoethyl)-1-Boc-piperazine, 1-(2-N-Boc-aminoethyl)piperazine, 4-(2-aminoethyl)-1-Boc-piperazine, 4-aminopiperidine, 3-aminopiperidine, 4-aminomethylpiperidine, 2-aminomethylpiperidine, 1-Boc-piperidine-4-carboxaldehyde, 1-Boc-piperidine-4-acetaldehyde, etc.

Any suitable $C_4$-$C_{24}$ diisocyanates can be used in the invention. Examples of preferred diisocyanates include without limitation tetramethylene diisocyanate, pentamethylene diisocyanate, hexamethylene diisocyanate, heptamethylene diisocyanate, 1,6-diisocyanato-2,2,4-trimethylhexane, octamethylene diisocyanate, dodecamethylene diisocyanate, cyclohexane diisocyanate, 1,3-bis-(4,4'-isocyantomethyl)cyclohexane, isophorone diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, etc.

Any suitable di-epoxy compounds can be used in the invention. Examples of preferred di-epoxy compounds are neopentyl glycol diglycidyl ether, 1,3-butadiene diepoxide, 1,4-butanediol diglycidyl ether, 1,2,7,8-diepoxyoctane, 3,4-epoxycyclohexylmethyl-3,4-epoxycyclohexane, 3,4-epoxycyclohexylmethyl-3,4-epoxycyclohexane carboxylate, vinylcyclohexene dioxide, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, bis[4-(glycidyloxy)phenyl]methane, bisphenol A diglycidyl ether (2,2-bis[4-(glycidyloxy)phenyl]propane), bisphenol A propoxylate diglycidyl ether, etc.

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, 1,4-bis(2-hydroxyethyl)piperazine, bisphenol A, bisphenol F, 4,4'-methylenediphenol, etc.

Any amino acids can be used in the invention. Examples of amino acids include without limitation glycine, proline, alanine, valine, isoleucine, leucine, 2-aminoisobutyric acid, 4-aminobutyric acid, 3-aminoisobutyyric acid, 3-amino-butyric acid, β-alanine, 1-amino-3-cyclopentane carboxylic acid, 3-aminocyclohexanecarboxylic acid, pyrrolidine-3-carboxylic acid, 4-piperidinecarboxylic acid, 3-piperidinecarboxylic acid, 1-piperazineacetic acid, etc.

Examples of compounds having one amino group and one hydroxyl or aldehyde group (or ketone group) include without limitation 1-piperazinepropanol, 2-[2-(1-piperazinyl)-ethoxy]ethanol, 4-amino-1-piperazineethanol, 4-piperidinemethanol, 1-Boc-piperidine-4-carboxaldehyde, 4-formylpiperidine, N-Boc-4-piperidineacetaldehyde, etc.

Preferred reactive (meth)acrylamido or (meth)acryloxy monomers without limitation include those described later in this application.

Preferred photochromic compounds without limitation include without limitation those compounds that are described later in this application and can be obtained from commercial suppliers or prepared according to procedures described in the patents discussed above and in the texts described above.

In a preferred embodiment, the thermal free radical initiator is an azo-containing radical initiator, preferably in an amount of from about 0.05% to about 2.0% (preferably from about 0.1% to about 1.75%, more preferably from about 0.15% to about 1.5%, even more preferably from about 0.2% to about 1.25%) by weight relative to the total weight of the polymerizable composition. An azo-containing radical initiator is a free radical initiator containing an azo moiety (*—N=N—*).

In a preferred embodiment, a polymerizable composition further comprises at least one UV-absorbing vinylic monomer and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 2.5%, preferably about 0.2% to about 20%, more preferably about 0.3% to about 1.5%, by weight of one or more UV-absorbing vinylic monomers, related to the amount of all polymerizable components in the polymerizable composition.

It is understood that the amount of at least one UV-absorbing vinylic monomer in the polymerizable composition is sufficient to render a contact lens, which is obtained from the curing of the polymerizable composition, an ability of blocking or absorbing (i.e., the inverse of transmittance) at least 90% (preferably at least about 95%, more preferably at least about 97.5%, even more preferably at least about 99%) of UVB (between 280 and 315 nanometers), at least 70% (preferably at least about 80%, more preferably at least about 90%, even more preferably at least about 95%) of UVA transmittance (between 315 and 380 nanometers), and optionally (but preferably) at least 30% (preferably at least about 40%, more preferably at least about 50%, even more preferably at least about 60%) of violet light between 380 nm and 440 nm, which impinge on the lens.

Any organic solvents known to a person skilled in the art can be used in the invention so long as the organic solvent can dissolve all polymerizable components to form a clear polymerizable composition. Examples of preferred organic solvents having 2 to 8 carbon atoms include without limitation, alcohols having 2 to 8 carbon atoms (e.g., ethanol, 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 2-hexanol, 3-hexanol, 2-heptanol, 2-octanol, 2-nonanol, 2-decanol, 3-octanol, 2-methyl-2-pentanol, 2,3-dimethyl-2-butanol, 3-methyl-3-pentanol, 2-methyl-2-hexanol, 3-methyl-3-hexanol, 3-methyl-3-heptanol, 4-methyl-4-heptanol, 2-methyl-2-heptanol, 3-ethyl-3-hexanol, 3-methyl-3-heptanol, 2,4-dimethyl-2-pentanol, 3-ethyl-3-pentanol, 1-methoxy-2-propanol, 3-ethoxy-1-propanol, 1-ethoxy-2-propanol, 1-isobutoxy-2-propanol, 3-methoxy-1-butanol, 1-methoxy-2-butanol, norborneol, 1-methylcyclohexanol, 1-methylcyclopentanol, 1-ethylcyclopentanol, 1-ethylcyclopentanol, 4-hydroxy-4-methyl-1-cyclopentanol, or combinations thereof), dipropylene glycol methyl ether, ethylene glycol n-butyl ether, acetone, methyl ethyl ketone, diethylene glycol n-butyl ether, diethylene glycol methyl ether, propylene glycol methyl ether, propylene glycol methyl ether acetate, propylene glycol n-propyl ether, propylene glycol n-butyl ether, ethyl acetate, butyl acetate, amyl acetate, methyl lactate, ethyl lactate, propyl lactate, 1-methyl-2-pyrrolidone, N,N-dimethylpropionamide, dimethyl formamide, dimethyl acetamide, dimethyl propionamide, N-methyl pyrrolidinone, and mixtures thereof. Preferably, the organic solvent is an alcohol having 3 to 5 carbon atoms (e.g., 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or combinations thereof).

In a preferred embodiment, the organic solvent has a boiling point that is higher than the second curing temperature but lower than 110° C. Examples of preferred organic solvents include without limitation, alcohols having 2 to 5 carbon atoms (e.g., ethanol, 1-propanol, isopropanol, sec-butanol, tert-butyl alcohol, tert-amyl alcohol, acetone, methyl ethyl ketone, ethyl acetate, and mixtures thereof. Preferably, the organic solvent is an alcohol having 2 to 5 carbon atoms (e.g., ethanol, 1-propanol, isopropanol, sec-butanol, tert-butyl alcohol, tert-amyl alcohol, or combinations thereof). With such a boiling point, the organic solvent could be evaporated to some extend at the third curing temperature or in a post-curing heating step at a post-curing temperature higher than 105° C. It is believed that the first and second curing stages are essential for building the polymer matrix of the contact lens. It would be desirable to minimize the evaporation of organic solvent during these two stage.

In accordance with the present invention, the polymerizable composition can also comprise additional polymerizable components selected from the group consisting of one or more secondary hydrophilic vinylic monomers (i.e., hydrophilic vinylic monomers other than hydrophilic (meth) acrylamido monomer), one or more secondary siloxane-containing vinylic monomers (i.e., siloxane-containing vinylic monomers other than siloxane-containing acrylamido monomer), one or more hydrophobic vinylic monomers free of any silicone, one or more non-silicone vinylic crossliners, and combinations thereof. It is understood that if the other polymerizable components are present in the polymerizable composition, their total amount is about 10% or less by weight (preferably about 7% or less by weight, more preferably about 4% or less by weight, even more preferably about 2% or less by weight) relative the total amount of all polymerizable component in the polymerizable composition.

Any hydrophilic vinylic monomers other than hydrophilic (meth)acrylamido monomer can be used as secondary hydrophilic vinylic monomers in the invention. Examples of such secondary hydrophilic vinylic monomers are hydroxyl-containing (meth)acryloxy monomers (as described below), amino-containing (meth)acryloxy monomers (as described later in this application), carboxyl-containing (meth)acryloxy monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), (meth)acryloxy monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof. Among the preferred hydrophilic vinylic monomers are 2-hydroxyethyl (meth)acrylate aminopropyl (meth)acrylate hydrochloride, dimethylaminoethyl (meth)acrylate, glycerol methacrylate (GMA), ethylene glycol methyl ether (meth)acrylate, N-vinyl-2-pyrrolidone (NVP), allyl alcohol, (meth)acrylic acid, a $C_1$-$C_4$-alkoxy polyethylene glycol (meth)acrylate having a weight average molecular weight of from 200 to 1500, N-vinyl acetamide, N-vinyl-N-methyl acetamide, allyl alcohol, and combinations thereof.

Any siloxane-containing vinylic monomer (other than siloxane-containing (meth)acrylamido monomers) known to a person skilled in the art can be used as secondary siloxane-containing vinylic monomer in the invention. Examples of such siloxane-containing vinylic monomers include without limitation siloxane-containing (meth)acryloxy monomers each having a bis(trialkylsilyloxy)alkylsilyl group or a tris (trialkylsilyloxy)silyl group, mono-(meth)acryloxy-terminated mono-alkyl-terminated polysiloxanes, 3-methacryloxy propylpentamethyldisiloxane, t-butyldimethylsiloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166, 236, 6,867,245, 8,415,405, 8,475,529, 8,614,261, and 9,217, 813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred siloxane-containing (meth)acryloxy monomers each having a bis(trialkylsilyloxy)alkylsilyl group or a tris (trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475, 529, 8,658,748, 9,097,840, 9,103,965, and 9,475,827.

Any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth) acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

A polymerizable composition of the invention can further comprise visibility tinting agents (e.g., D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, or mixtures thereof), antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), and the like, as known to a person skilled in the art.

In accordance with the invention, a polymerizable composition of the invention is a fluid composition which can be a solution. Such a polymerizable composition can be prepared by dissolving all of the desirable components in the organic solvent as known to a person skilled in the art.

In various preferred embodiments, a polymerizable composition of the invention comprises: (1) from about 15% to about 55%, preferably from about 20% to about 50%, more preferably from about 20% to about 45%, even more preferably from about 20% to about 40% by weight, of at least one hydrophilic (meth)acrylamido monomer; (2) from about 5% to about 50% by weight, preferably from about 5% to about 45% by weight, more preferably from about 10% to about 40% by weight of at least one siloxane-containing (meth)acrylamido monomer; (3) from about 5% to about 50%, preferably from about 10% to about 45% by weight, more preferably from about 10% to about 40% by weight, of at least one polysiloxane vinylic crosslinker all of the ethylenically-unsaturated groups of which are (meth)acrylamido groups and or (meth)acryloxy groups; (4) from about 0.005% to about 1.0% by weight, or from about 0.01% to about 0.8% by weight, or from about 0.02% to about 0.6% by weight, or from about 0.05% to about 0.5% by weight of at least one photochromic compound; (5) from about 0.05% to about 1.5% by weight, preferably from about 0.1% to 1.4% by weight, more preferably from about 0.2% to about 1.3% by weight of at least one thermal free radical initiator; and (6) from about 0.1% to about 2.5% by weight, preferably from about 0.2% to about 2.0% by weight, more preferably from about 0.3% to about 1.5% by weight, of at least one UV-absorbing vinylic monomer. The foregoing range combinations are presented with the proviso that the listed components and any additional components add up to 100% by weight.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable composition subsequently is cured (i.e., polymerized) thermally to produce a molded unprocessed photochromic silicone hydrogel lens precursor. It is advantageous to previously degas the components and solvents used in the polymerization reaction. It is also advantageous to thermally cure the polymerizable composition in the oven under an inert atmosphere, e.g., under $N_2$ or Ar atmosphere.

Opening of the mold so that the molded photochromic SiHy contact lens can be removed from the mold may take place in a manner known per se.

The molded photochromic SiHy contact lenses can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The molded photochromic SiHy contact lenses can also subject to further processes, such as, for example, surface treatment (for example, such as, plasma treatment, chemical treatments, the grafting of hydrophilic monomers or macromers onto the surface of a lens, Layer-by-layer coating, in-package crosslinking of a thermally-reactive hydrophilic polymeric material, etc.); packaging in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), or an in-package-coating material; sterilization such as autoclave at from 118 to 124° C. for at least about 30 minutes; and the like.

Preferred surfaces treatments are LbL coating such as those described in U.S. Pat. Nos. 6,451,871, 6,719,929, 6,793,973, 6,811,805, 6,896,926, plasma treatment, in-package-coating such as those disclosed in U.S. Pat. Nos. 8,557, 334, 8,529,057 and 9,505,184. A preferred plasma treatment is those processes in which an ionized gas is applied to the surface of an article as described in U.S. Pat. Nos. 4,312,575 and 4,632,844.

The molded photochromic SiHy contact lens is hydrated in water or an aqueous solution to replace the liquid extraction medium, according to any method known to a skilled person.

The hydrated and/or surface-treated photochromic SiHy contact lens can further subject to further processes, such as, for example, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A contact lens of the invention has an oxygen permeability of preferably at least about 40 barrers, more preferably at least about 60 barrers, even more preferably at least about 80 barrers (at about 35° C.).

A contact lens of the invention has an elastic modulus of about 1.5 MPa or less, preferably about 1.2 MPa or less, more preferably from about 0.3 MPa to about 1.0 MPa (at a temperature of from about 22° C. to 28° C.).

A contact lens of the invention further has an equilibrium water content of from about 15% to about 75%, more preferably from about 20% to about 70% by weight, even more preferably from about 25% to about 65% by weight (at room temperature) when fully hydrated. The equilibrium water content of a photochromic SiHy contact lens can be measured according to the procedure disclosed in Example 1.

In a further aspect, the invention provides a photochromic SiHy contact lens obtained by the method of the invention.

All of the various embodiments of the molds, polymerizable composition, and spatial limitation of radiation, and contact lens of the invention described above can be used in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing photochromic contact lenses, comprising the steps of:
   (1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (2) introducing a polymerizable composition into the cavity, wherein the polymerizable composition comprises
      (a) at least one hydrophilic (meth)acrylamido monomer,
      (b) at least one siloxane-containing (meth)acrylamido monomer,
      (c) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonyl-amino groups, vinyloxycarbonyloxy groups, or combinations thereof,
      (d) at least one photochromic compound,
      (e) at least one thermal free radical initiator having a 10-hour half-life temperature (designated as $T_{10h\lambda}$) of from about 50° C. to about 90° C., and
      (f) from about 4% to about 20% by weight of an organic solvent relative to the total weight of the polymerizable composition,
   wherein the sum of the amounts of components (a) to (c) is at least 90% by weight relative to total amount of all polymerizable components in the polymerizable composition;
   (3) curing thermally the polymerizable composition in the lens mold in an oven to form an unprocessed photochromic silicone hydrogel lens precursor, wherein the step of curing thermally comprises
      (a) maintaining a first curing temperature of from about $(T_{10h\lambda}-20)$° C. to about $T_{10h\lambda}$° C. for a first curing time,
      (b) maintaining a second curing temperature of from about $(T_{10h\lambda}+10)$° C. to about $(T_{10h\lambda}+35)$° C. for a second curing time, and
      (c) optionally maintaining a third curing temperature of about 100° C. for a third curing time; and
   (4) subjecting the unprocessed photochromic silicone hydrogel lens precursor to one or more post-molding processes selected from the group consisting of extraction, surface treatment, hydration, packaging, sterilization, and combinations thereof, to form a photochromic silicone hydrogel contact lens.

2. The method of embodiment 1, wherein the step of curing thermally comprises (c) maintaining a third curing temperature of about 100° C. for a third curing time.

3. The method of embodiment 1 or 2, wherein the sum of the amounts of components (a) to (c) is at least 92% by weight relative to total amount of all polymerizable components in the polymerizable composition.

4. The method of embodiment 1 or 2, wherein the sum of the amounts of components (a) to (c) is at least 94% by weigh relative to total amount of all polymerizable components in the polymerizable composition.

5. The method of any one of embodiments 1 to 4, wherein the polymerizable composition comprises from about 5% to about 17% by weight of the organic solvent relative to the total weight of the polymerizable composition.

6. The method of any one of embodiments 1 to 4, wherein the polymerizable composition comprises from about 6% to about 15% by weight of the organic solvent relative to the total weight of the polymerizable composition.

7. The method of any one of embodiments 1 to 4, wherein the polymerizable composition comprises from about 6% to about 13% by weight of the organic solvent relative to the total weight of the polymerizable composition.

8. The method of any one of embodiments 1 to 7, wherein the polymerizable composition comprises at least one photochromic compound in an amount of from about 0.005% to about 1.0% by weight, relative to the total weight of the polymerizable composition.

9. The method of any one of embodiments 1 to 7, wherein the polymerizable composition comprises at least one photochromic compound in an amount of from about 0.01% to about 0.8% by weight, relative to the total weight of the polymerizable composition.

10. The method of any one of embodiments 1 to 7, wherein the polymerizable composition comprises at least one photochromic compound in an amount of from about 0.02% to about 0.6% by weight, relative to the total weight of the polymerizable composition.

11. The method of any one of embodiments 1 to 7, wherein the polymerizable composition comprises at least one photochromic compound in an amount of from about 0.05% to about 0.5% by weight, relative to the total weight of the polymerizable composition.

12. The method of any one of embodiments 1 to 11, wherein said at least one hydrophilic (meth)acrylamido monomer comprises (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis(2-hydroxyethyl) (meth)acrylamide, N-tris(hydroxymethyl) methyl (meth)acrylamide, 2-(meth)acrylamidoglycolic acid, 3-(meth)acrylamido-propionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl)boronic acid, 3-((3-methacrylamidopropyl)dimethylammonio))-propane-1-sulfonate; 3-((3-acrylamidopropyl)dimethylammonio) propane-1-sulfonate, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, poly(ethylene glycol) ethyl (meth)acrylamide having a number average molecular weight of up to 700, methoxy-poly(ethylene glycol) ethyl (meth)acrylamide having a number average molecular weight of up to 700, or combination thereof.

13. The method of any one of embodiments 1 to 11, wherein said at least one hydrophilic (meth)acrylamido monomer comprises N,N-dimethyl (meth)acrylamide, N-ethyl (meth)acrylamide, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, (meth)acrylamide, N-(2-aminoethyl)(meth)acrylamide, N-(3-aminopropyl)(meth)acrylamide, or combinations thereof, more preferably is N,N-dimethylacrylamide.

14. The method of any one of embodiments 1 to 11, wherein said at least one hydrophilic (meth)acrylamido monomer comprises N,N-dimethyl (meth)acrylamide.

15. The method of any one of embodiments 1 to 14, wherein said at least one siloxane-containing (meth)acrylamido monomer comprises a (meth)acrylamido monomer containing a tris(trialkylsiloxy)silyl group.

16. The method of embodiment 15, wherein the (meth)acrylamido monomer containing a tris(trialkylsiloxy)silyl group is N-[tris(trimethylsiloxy)silylpropyl] (meth)acrylamide, N-[tris(dimethylethylsiloxy)-silylpropyl] (meth)acrylamide, N-[tris(dimethylpropylsiloxy)silylpropyl] acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl)propyloxy)propyl] acrylamide, or a combination thereof.

17. The method of any one of embodiments 1 to 16, wherein said at least one siloxane-containing (meth)acrylamido monomer comprises a (meth)acrylamido monomer containing a bis(trialkylsilyloxy)alkylsilyl group.

18. The method of embodiment 17, wherein the (meth)acrylamido monomer containing a bis(trialkylsilyloxy)alkylsilyl group is N-(2-hydroxy-3-(3-(bis(trimethylsilyloxy)methylsilyl)propyloxy)propyl)-2-methyl acrylamide, N-(2-hydroxy-3-(3-(bis(trimethylsilyloxy)methylsilyl)propyloxy)propyl) acrylamide, N,N-bis[2-hydroxy-3-(3-(bis(trimethylsilyloxy)methylsilyl)propyloxy)propyl]-2-methyl acrylamide, N,N-bis[2-hydroxy-3-(3-(bis(trimethylsilyloxy)methylsilyl)propyloxy)propyl] acrylamide, N-[2-hydroxy-3-(3-(t-butyldimethylsilyl)propyloxy)propyl]-2-methyl acrylamide, a siloxane-containing (meth)acrylamido monomer of one of formula (Ia) to (Ih)

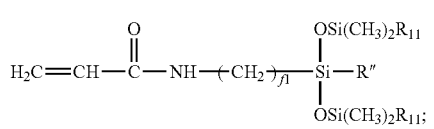

(Ia)

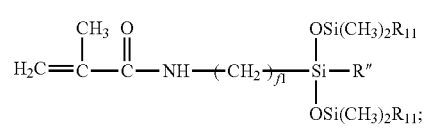

(Ib)

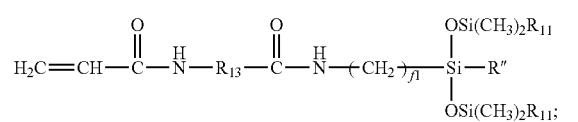

(Ic)

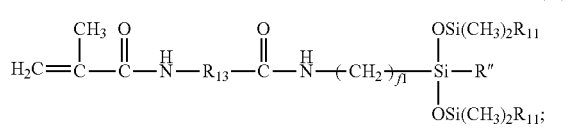

(Id)

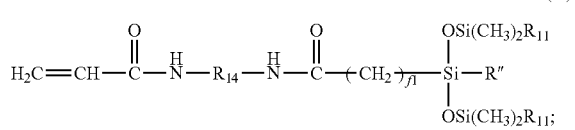

(Ie)

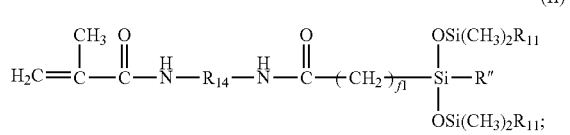

(If)

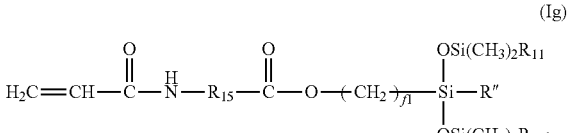

(Ig)

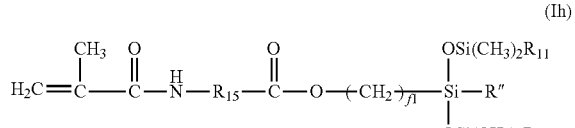

(Ih)

in which $R_{13}$ is a divalent alkylene radical of —$CH_2CH_2$—, —$CH_2CH_2CH_2$—, —$CH_2CH_2CH_2CH_2$—

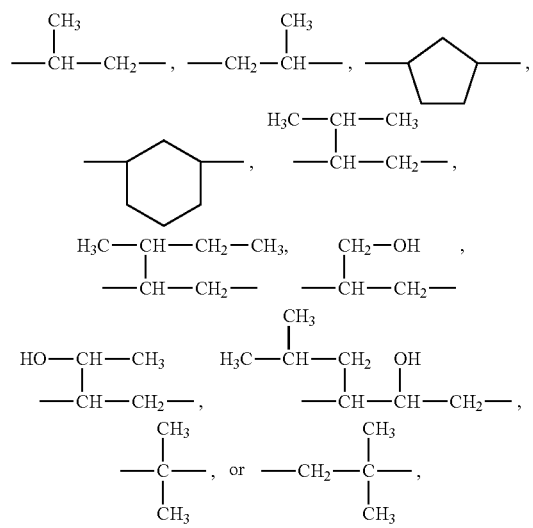

$R_{14}$ is a divalent alkylene radical of —$CH_2CH_2$— or —$CH_2CH_2CH_2$—, and $R_{15}$ is a divalent alkylene radical of $$-\underset{\underset{CH_3}{|}}{\overset{\overset{CH_3}{|}}{C}}-\quad \text{or} \quad -CH_2-\underset{\underset{CH_3}{|}}{\overset{\overset{CH_3}{|}}{C}}-,$$

R'' and $R_{11}$ independent of each other is $C_1$-$C_4$ alkyl, and f1 is an integer of from 3 to 5.

19. The method of any one of embodiments 1 to 18, wherein said at least one siloxane-containing (meth)acrylamido monomer comprises a mono-(meth)acrylamido-terminated oligo- or polysiloxane of formula (IIa)

(IIa)

$$H_2C=\overset{R'}{\underset{|}{C}}-\overset{O}{\underset{||}{C}}-NH-(R_9)_{g1}-(Y_1)_{g2}-R_{10}-(\underset{\underset{CH_3}{|}}{\overset{\overset{CH_3}{|}}{Si}}-O)_{h1}\underset{\underset{CH_3}{|}}{\overset{\overset{CH_3}{|}}{Si}}-R''$$

in which R' is hydrogen or methyl, R'' independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of $$-NH-\overset{O}{\underset{||}{C}}-, \quad -\overset{O}{\underset{||}{C}}-NH-, \quad \text{or} \quad -\underset{\underset{R_{12}}{|}}{\overset{\overset{R_{12}'}{|}}{C}}-\overset{O}{\underset{||}{C}}-O-$$

in which $R_{12}$ and $R_{12}'$ independent of each other are $C_1$-$C_6$ alkyl.

20. The method of embodiment 19, wherein in formula (IIa) h1 is an integer of 3 to 20 (more preferably 3 to 15)

21. The method of embodiment 19 or 20, wherein in formula (IIa) $R_{12}$ and $R_{12}'$ independent of each other are methyl.

22. The method of any one of embodiments 1 to 21, wherein said at least one polysiloxane vinylic crosslinker comprises: an α,ω-(meth)acryloxy-terminated polydimethylsiloxane; an α,ω-(meth)acrylamido-terminated polydimethylsiloxane; an α,ω-vinyloxycarbonyloxy-terminated polydimethylsiloxane; an α,ω-vinyloxycarbonylamino-terminated polydimethylsiloxane; a bis-3-methacryloxy-2-hydroxypropyloxypropyl polydimethylsiloxane; N,N,N',N'-tetrakis(3-methacryloxy-2-hydroxypropyl)-alpha, omega-bis-3-aminopropyl-polydimethylsiloxane of various molecular weight; a reaction product of glycidyl methacrylate with a di-amino-functionalized polydimethylsiloxane; a reaction product of an azlactone-containing vinylic monomer with a d-hydroxyl-functionalized polydimethylsiloxane; or combinations thereof.

23. The method of any one of embodiments 1 to 22, wherein said at least one polysiloxane vinylic crosslinker comprises a vinylic crosslinker of formula (H)

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{01}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of —$R_{h4}$—O—$R_{h5}$— in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

(H-a)

$$-(CH_2)_{\overline{m1}}-(O-CH_2)_{\overline{k1}}-\underset{\underset{OH}{|}}{\overset{\overset{R_{h6}}{|}}{C}}-CH_2-X_{h1}-R_{h7}-(OH)_{m2}$$

(H-b)

$$-(CH_2)_{\overline{m3}}-X_{h2}-R_{h8}-(OH)$$

(H-c)

$$-(CH_2)_{\overline{3}}-O-CH_2-\underset{\underset{R_{h9}}{|}}{\overset{\overset{CH_2OH}{|}}{C}}-CH_2OH$$

(H-d)

$$-(CH_2)_{\overline{3}}-O-\underset{\underset{R_{h11}}{\phantom{|}}}{\overset{\overset{R_{h10}}{\phantom{|}}}{\bigcirc}}-OH$$

(H-e)

$$-(CH_2)_{\overline{m1}}-(O-CH_2)_{\overline{k1}}-\underset{\underset{OH}{|}}{\overset{\overset{R_{h6}}{|}}{C}}-CH_2-OH$$

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and (H)

$$H_2C=\overset{R_{h0}}{\underset{|}{C}}-\overset{O}{\underset{||}{C}}-X_{01}-R_{h1}-\underset{\underset{CH_3}{|}}{\overset{\overset{CH_3}{|}}{Si}}-O-(\underset{\underset{CH_3}{|}}{\overset{\overset{CH_3}{|}}{Si}}-O)-(\underset{\underset{CH_3}{|}}{\overset{\overset{R_{h3}}{|}}{Si}}-O)-\underset{\underset{CH_3}{|}}{\overset{\overset{CH_3}{|}}{Si}}-R_{h2}-X_{01}-\overset{O}{\underset{||}{C}}-\overset{R_{h0}}{\underset{|}{C}}=CH_2$$

$X_{h2}$ is a linkage of

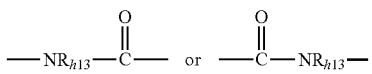

in which $R_{h13}$ is hydrogen or $C_1$-$C_{10}$ alkyl.

24. The method of any one of embodiments 1 to 23, wherein said at least one polysiloxane vinylic crosslinker comprises: (1) a vinylic crosslinker which comprises one sole polysiloxane segment and two terminal ethylenically-unsaturated groups selected from the group consisting of (meth)acryloyloxy groups, (meth)acryloylamino groups, vinyloxycarbonyloxy groups, vinyloxycarbonylamino groups; and/or (2) a chain-extended polysiloxane vinylic crosslinker which comprises at least two polysiloxane segment and a covalent linker between each pair of polysiloxane segments and two two terminal ethylenically-unsaturated groups selected from the group consisting of (meth)acryloyloxy groups, (meth)acryloylamino groups, vinyloxycarbonyloxy groups, vinyloxycarbonylamino groups.

25. The method of any one of embodiments 1 to 24, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxy-ethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxy-propyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxy-propyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamido-propylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

26. The method of any one of embodiments 1 to 25, wherein said at least one photochromic compound comprises a naphthopyran, an indeno-fused naphthopyran (i.e., indeno-naphthopyran), a heterocyclic ring-fused naphthopyrian, a benzopyran, a phenanthropyran, a quinopyran, a quinolinopyran, a fluoroanthenopyran, an anthracene-fused pyran, a tetracene-fused pyran, a spiro (benzindoline) naphthopyran, a spiro(indoline) naphthopyran, a spiro(indoline)benzopyran, a spiro (indoline)quinopyran, a spiro(indoline)pyran, a naphthoxazine, a spirobenzopyran, a spirobenzothiopyran, a naphthacenedione, a benzoxazine, a spirooxazine, a naphthoxazine, a spiro(benzindoline)naphthoxazine, a spiro(indoline)naphthoxazine, a spiro(indoline)pyridobenzoxazine, a spiro(indoline)benzoxazine, a spiro(benzindoline) benzoxazine, a spiro(benzindoline)pyridobenzoxazine, a spiro(indoline) fluoranthenoxazine, a spiro (indoline)-quinoxazine, a spiropiperidine-naphthopyran, a piro(indoline)pyronobenzoxazinone, a benzospiropyran, a naphthospiropyran, a spirobenzoxazine-pyrrolopyridine, a spironaphthoxazine-pyrrolopyrridine, a spiro-oxazepin-benzoxazine, a spiro-oxazepin-naphthoxazine, a spiro(indoline) benzothiazoloxazine, a spiro(indoline) benzopyrroloxazine, a spiro(indoline)quinazolinooxazine, a spiro(indoline)-anthracenobenzoxazine, a benzofurobenzopyran, a benzothienobenzopyran, a naphthofurobenzopyran, a benzopyrano-fused naphthopyran, a spiro(isoindoline)-naphthoxazine, a spiro(isoindoline)benzoxazine, or a mixture thereof.

27. The method of embodiment 26, wherein said at least one photochromic compound is polymerizable (i.e., comprising an ethylenicaly-unsaturated group).

28. The method of embodiment 27, wherein said at least one photochromic compound is a coupling reaction product of a reactive (meth)acrylamido or (meth)acryloxy monomer having a first reactive functional group and a reactive photochromic compound have a second reactive functional group in the absence or presence of a coupling agent under coupling reaction, wherein the first reactive functional group is selected from the group consisting of —COCl, —COBr, —COOH, —NHR$_{N2}$, —NCO, —OH, —CHO,

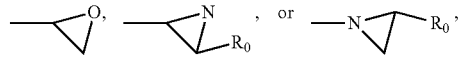

wherein the second reactive functional group is selected from the group consisting of —COOH, —NHR$_{N2}$,

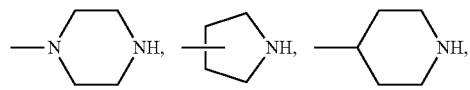

—NCO, —OH, —SH, —CHO,

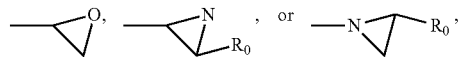

wherein R$_0$ is hydrogen or methyl and R$_{N2}$ is hydrogen, a linear or branched $C_1$-$C_{15}$ alkyl, cyclohexyl, cyclopentyl, a substituted or unsubstituted phenyl, or a substituted- or unsubstituted-phenyl-$C_1$-$C_6$ alkyl.

29. The method of embodiment 27, wherein reactive (meth)acrylamido or (meth)acryloxy monomer is selected from the group consisting of (meth)acryloyl halides ($CH_2$=CH—COX or $CH_2$=$CCH_3$—COX, X=$C_1$ or Br), N-hydroxysuccinimide ester of (meth)acrylic acid, glycidyl (meth)acrylate, isocyanato-$C_2$-$C_6$ alkyl (meth)acrylate, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$ alkylacrylic acid (e.g., ethylacrylic acid, propylacrylic acid, butylacrylic acid), N-2-acrylamidoglycolic acid, 3-(acryloylxy)propanoic acid, $C_2$-$C_6$ hydroxylalkyl (meth)acrylate, $C_2$—C hydroxyalkyl (meth)acrylamide, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), acrolein, methacrolein, crotonaldehyde, and combinations thereof.

30. The method of embodiment 28 or 29, wherein the reactive photochromic compound comprises 3,3-bis(4-methoxyphenyl)-6,11-dimethyl-13-hydroxyethoxy-13-phenyl-3H,13H-indeno [2',3':3,4]naphtho[1,2-b]pyran; 3,3-bis(4-methoxyphenyl)-6,11-dimethyl-13-(2-hydroxycarbonylethyl)carboxy-13-phenyl-3H,13H-indeno [2',3':3,4]naphtho[1,2-b]pyran; 3,3-bis(4-methoxyphenyl)-6,11-dimethyl-13-hydroxy-13-phenyl-3H,13H-indeno [2',3':3,4]naphtho[1,2-b]pyran; 3,3-bis(4-methoxyphenyl)-6,11-dimethyl-13-(2-hydroxycarbonylethyl) carboxy-13-phenyl-3H,13H-indeno [2',3':3,4] naphtho[1,2-b]pyran; 3,3-bis(4-methoxyphenyl)-6,11-dimethyl-13-hydroxy-13-propyl-3H,13H-indeno[2',3':3,4]-naphtho[1,2-b]pyran; 3,3-bis(4-methoxyphenyl)-6,11-dimethyl-13-(2-hydroxycarbonyl-ethyl)carboxy-13-propyl-3H,13H-indeno[2',3':3,4]-naphtho[1,2-b]pyran; 3,3-di(4-methoxyphenyl)-10,11-dimethoxy-13-hydroxy-13-ethyl-3H,13H-indeno[2,1-f]naphtho[1,2-b]pyran; 3,3-di(4-methoxyphenyl)-10,11-dimethoxy-13-(2-hydroxycarbonylethyl)carboxy-13-ethyl-3H,13H-indeno[2,1-f]naphtho[1,2-b]pyran; 3,3-bis(4-methoxyphenyl)-7-methoxy-11-phenyl-13-hydroxymethyl-13-methyl-3H, 13H-indeno[2',3':3,4] naphtho[1,2-b]pyran; 3,3-bis(4-methoxyphenyl)-7-methoxy-11-phenyl-13-(2-hydroxycarbonylethyl)carboxymethyl-13-methyl-3H, 13H-indeno[2',3':3,4]-naphtho[1,2-b]pyran; 3,3-bis(4-methoxyphenyl)-7-methoxy-11-phenyl-13-hydroxy-13-methyl-3H,13H-indeno[2',3':3,4]naphtho[1,2-b]pyran; 3,3-bis(4-methoxyphenyl)-7-methoxy-11-phenyl-13-(2-hydroxycarbonylethyl)carboxy-13-methyl-3H,13H-indeno-[2',3':3,4]naphtho[1,2-b]pyran; 3,3-bis(4-methoxyphenyl)-11-phenyl-13-hydroxy-13-methyl-3H,13H-indeno[2',3':3,4]naphtho[1,2-b]pyran; 3,3-bis(4-methoxyphenyl)-11-phenyl-13-(2-hydroxycarbonylethyl)carboxy-13-methyl-3H,13H-indeno[2',3':3,4]-naphtho[1,2-b]pyran; 3,3-di(4-methoxyphenyl)-6,7,10,11-tetramethoxy-13-hydroxy-13-ethyl-3H,13H-indeno[2,1-f]naphtho[1,2-b]pyran; 3,3-bis(4-methoxyphenyl)-6,7,10,11-tetramethyl-13-(2-hydroxycarbonylethyl)carboxy-13-methyl-3H,13H-indeno[2',3':3,4]naphtho[1,2-b]pyran; 3,3-di(4-methoxyphenyl)-6,7-dimethoxy-13-hydroxy-13-ethyl-3H,13H-indeno[2,1-f]naphtho[1,2-b]pyran; 3,3-bis(4-methoxyphenyl)-11-(4-(4,5-diphenyl-1H-imidazol-2-yl)phenyl-13,13-dimethyl-3H, 13H-indeno[2',3':3,4] naphtho[1,2-b]pyran; 3,3-di(4-methoxyphenyl)-6-methoxy-7-(3-hydroxymethylenepiperidin-1-yl)-13,13-dimethyl-3H,13H-indeno[2',3':3,4]naphtho[1.2-b]pyran; 3,3-di(4-methoxyphenyl)-6-methoxy-7-(3-(2-hydroxycarbonylethyl)-carboxymethylenepiperidin-1-yl)-13,13-dimethyl-3H,13H-indeno[2',3':3,4]naphtho[1.2-b]pyran; 3,3-di(4-methoxyphenyl)-6,7-dimethoxy-13-hydroxy-13-butyl-3H,13H-indeno[2,1-f]naphtho[1,2-b]pyran; 3,3-di(4-methoxyphenyl)-6,11,13-trimethyl-13-(2-(2-hydroxyethoxy)-ethoxy)-indeno[2,1-f]naptho[1,2-b]pyran; 3,3-di(4-methoxyphenyl)-6,11,13-trimethyl-13-(2-(2-(2-(2-hydroxyethoxy)ethoxy)ethoxy)-ethoxy)-indeno[2,1-f]naptho[1,2-b]pyran; 3,3-diphenyl-13-hydroxy-13-(2-oxo-2-ethoxyethyl)-1H-indeno[2,1-f]naphtho[1,2-b]pyran; 3,3-di(4-methoxyphenyl)-6,11-dimethyl-13-hydroxy-13-(2-oxo-2-ethoxyethyl)-1H-indeno[2,1-f]naphtho[1,2-b] pyran; 3,3-di(4-methoxyphenyl)-6,11-dimethyl-13-butyl-13-hydroxy-indeno[2,1-f]naphtho[1,2-b]pyran; 3,3-bis(4-hydroxyphenyl)-7-methoxy-11-phenyl-13,13-diethyl-3H, 13H-indeno[2',3':3,4]-naphtho[1,2-b]pyran; 3,3-bis(4-hydroxyphenyl)-7-methoxy-11-phenyl-13,13-dipropyl-3H,13H-indeno[2',3':3,4]naphtho[1,2-b]pyran; 3,3-bis(4-hydroxyphenyl)-7-methoxy-11-phenyl-13-carbomethoxy-13-methyl-3H,13H-indeno[2',3':3,4] naphtho[1,2-b]pyran; 3,3-diphenyl-6,7-dimethoxy-13-methyl-13-methyl-13-hydroxyethoxy-ethoxyethyl-3H, 13H-indeno[2',3':3,4]naphtho[1,2-b]pyran; 3,3-diphenyl-6,7,10,11-tetramethoxy-13-ethyl-13-methyl-13-hydroxyethoxyethoxy-3H,13H-indeno[2',3':3,4]naphtho [1,2-b]pyran; 6,7-dimethoxy-2,2-diphenyl-13-hydroxy-13-butyl-2H,13H-indeno[1',2':4,3] naphtho[1,2-b]pyran; 6,7-dimthoxy-2,2-diphenyl-13-hydroxy-13-methyl-2H,13H-indeno[1',2':4,3]naphtho[1,2-b]pyran; 6,7-dimthoxy-2,2-diphenyl-13-hydroxy-2H,13H-indeno[1',2':4,3]naphtho[1,2-b]pyran; 3-(4-allyloxyphenyl)-3-(4-morpholinophenyl)-7-methoxy-11-phenyl-13,13-dimethy-3H,13H-indeno[2',3':3,4]naphtho[1,2-b]pyran; 3-(4-fluorophenyl)-3-(4-butoxyphenyl)-10-(piperazin-1-yl)-6-trifluoromethyl-13,13-dimethyl-3H,13H-indeno[2',3':3:4]naphtho[1,2-b]pyran; 3-(4-fluorophenyl)-3-(4-butoxyphenyl)-10-(4-hydroxybenzamido)-6-trifluoromethyl-13,13-dimethyl-3H,13H-indeno[2',3':3:4]naphtho[1,2-b]pyran; 3-(4-fluorophenyl)-3-(4-butoxyphenyl)-10-vinyl-6-trifluoromethyl-13,13-dimethyl-3H,13H-indeno[2',3':3:4]naphtho-[1,2-b]pyran; 3-(4-fluorophenyl)-3-(4-butoxyphenyl)-10-(carboxylic acid)-6-trifluoromethyl-13,13-dimethyl-3H,13H-indeno [2',3':3:4]naphtho[1,2-b]pyran; 3-(4-fluorophenyl)-3-(4-methoxyphenyl)-6-methoxy-7-(4-hydroxypiperidin-1-yl)-13,13-dimethyl-3H,13H-indeno[2',3':3,4]naphtho[1, 2-b]pyran; 3-(4-fluorophenyl)-3-(4-methoxyphenyl)-6-methoxy-7-(4-(2-hydroxycarbonylethyl)

carboxypiperidin-1-yl)-13,13-dimethyl-3H,13H-indeno[2',3':3,4]naphtho[1,2-b]pyran; 3-(4-fluorophenyl)-3-(4-morpholinophenyl)-6-methoxy-7-(4-hydroxypiperidin-1-yl)-13,13-dimethyl-3H,13H-indeno[2',3':3,4]naphtho[1.2-b]pyran; 3-(4-fluorophenyl)-3-(4-morpholinophenyl)-6-methoxy-7-(4-(2-hydroxycarbonyl-ethyl) carboxypiperidin-1-yl)-13,13-dimethyl-3H,13H-indeno[2',3':3,4] naphtho[1.2-b]pyran; 3-(4-hydroxyethoxyphenyl)-3-(4-methoxyphenyl)-11-(4-(N,N-dimethylamino)phenyl)-13,13-dimethyl-3H,13H-indeno[2',3':3,4]naphtho[1,2-b]pyran; 3-(4-methoxyphenyl)-3-(2,4-dimethoxyphenyl)-phenyl-6,11-dimethoxy-13-methyl-13-methyl-13-hydroxyethoxy-ethoxyethoxy-3H,13H-indeno[2',3':3,4]naphtho[1,2-b]pyran; 3-(4-methoxyphenyl)-3-(3-methyl-4-methoxyphenyl)-13-hydroxy-indeno[2,1-f]naphtho[1,2-b]pyran; 3-(4-methoxyphenyl)-3-(4-morpholinophenyl)-6,7,10,11-tetramethoxy-13-hydroxy-13-ethyl-3H,13H-indeno[2,1-f]naphtho[1,2-b]pyran; 3-(4-methoxyphenyl)-3-(4-morpholinophenyl)-6,7,10,11-tetramethoxy-13-hydroxy-13-butyl-3H,13H-indeno[2,1-f]naphtho[1,2-b]pyran; 3-(4-methoxyphenyl)-3-(4-morpholinophenyl)-6,7-dimethoxy-13-hydroxy-13-ethyl-3H,13H-indeno [2,1-f]naphtho[1,2-b]pyran; 3-(4-methoxyphenyl)-3-(4-morpholinophenyl)-6,7-dimethoxy-13-hydroxy-13-methyl-3H,13H-indeno[2,1-f]naphtho[1,2-b]pyran; 3-(4-methoxyphenyl)-3-(4-morpholinophenyl)-13-oxo-3H,13H-indeno[2,1-f]naphtho[1,2-b]pyran; 3-(4-methoxyphenyl)-3-phenyl-6-methoxy-7-mprphlino-13-methyl-13-methyl-13-hydroxyethoxyethoxyethoxy-3H,13H-indeno[2',3':3,4]naphtho[1,2-b]pyran; 3-(4-methoxyphenyl)-3-phenyl-6,11-dimethoxy-13-methyl-13-methyl-13-hydroxyethoxyethoxy-3H,13H-indeno[2',3':3,4]naphtho[1,2-b]pyran; 2-(4-methoxyphenyl)-2-(4-morpholinophenyl)-5-hydroxy-6-carboethoxy-2H-naphtho[1,2-b] pyran; 3-(4-morpholinophenyl)-3-phenyl-6,7-dimethoxy-13-hydroxy-13-ethyl-3H,13H-indeno[2,1-f]naphtho[1,2-b]pyran; 3-(4-morpholinophenyl)-3-phenyl-6,7-dimethoxy-13-hydroxy-13-butyl-3H,13H-indeno[2,1-f]naphtho[1,2-b]pyran; 3-(4-morpholinophenyl)-3-phenyl-6,7-dimethoxy-13-oxo-3H,13H-indeno[2,1-f]naphtho[1,2-b]pyran; 3-phenyl-3-(4-hydroxyethoxyphenyl)-6-methoxy-7-morpholino-13,13-dimethyl-3H,13H-indeno-[2',3':3,4]naphtho[1,2-b]pyran; 3-phenyl-3-(4-(2-hydroxycarbonylethyl)carboxyethoxy-phenyl)-6-methoxy-7-morpholino-13,13-dimethyl-3H,13H-indeno[2',3':3,4]naphtho[1,2-b]pyran; 3-phenyl-3-(4-(2-hydroxyethoxy)phenyl)-6-methoxy-7-piperidino-13,13-dimethy-3H,13H-indene[2',3':3,4]naphtho[1,2-b]pyran; 3-phenyl-3-(4-(2-(2-hydroxycarbonylethyl)-carboxyethoxy)phenyl)-6-methoxy-7-piperidino-13,13-dimethy-3H,13H-indene[2',3':3,4]naphtho[1,2-b]pyran; 3-phenyl-3-(4-hydroxyphenyl)-6,7-dimethoxy-13,13-dimethyl-3H,13H-indeno[2',3':3,4]naphtho[1,2-b]pyran; 3-phenyl-3-(4-hydroxyethoxy)phenyl)-6,7-dimethoxy-13,13-dimethyl-3H,13H-indeno[2',3':3,4]-naphtho[1,2-b]pyran; 3-phenyl-3-(4-(2-hydroxycarbonylethyl)carboxyethoxy)phenyl)-6,7-dimethoxy-13,13-dimethyl-3H,13H-indeno[2',3':3,4]naphtho[1,2-b]pyran; 3-phenyl-3-(4-(2-hydroxycarbonylethyl)carboxy-phenyl)-6,7-dimethoxy-13,13-dimethyl-3H,13H-indeno[2',3':3,4]naphtho[1,2-b]pyran; 3-phenyl-3-(4-(4-(2-hydroxyethyl)piperazin-1-yl)phenyl)-13,13-dimethyl-3H,13H-indeno[2',3':3,4]naphtho[1,2-b]pyran; 3-phenyl-3-(4-(4-(2-(2-hydroxycarbonylethyl)-carboxyethyl)piperazin-1-yl)phenyl)-13,13-dimethyl-3H,13H-indeno[2',3':3,4]naphtho-[1,2-b]pyran; 3-phenyl-3-(4-methoxyphenyl)-6-methoxy-7-piperazinyl-13,13-dimethyl-3H,13H-indene[2',3':3,4]naphtho[1,2-b]pyran; 3-phenyl-3-(4-methoxyphenyl)-6-methoxy-7-(3-hydroxymethylenepiperidin-1-yl)-13,13-dimethyl-3H,13H-indeno [2',3":3.4]naphtho[1.2-b]pyran; 3-phenyl-3-(4-methoxyphenyl)-6-methoxy-7-(3-(2-hydroxycarbonylethyl) carboxymethylenepiperidin-1-yl)-13,13-dimethyl-3H,13H-indeno[2',3":3.4]naphtho[1.2-b]pyran; 3-phenyl-3-(4-methoxyphenyl)-6-methoxy-7-(4-hydroxypipendin-1-yl)-13,13-dimethyl-3H,13H-indeno[2',3':3,4]naphtho-[1,2-b]pyran; 3-phenyl-3-(4-methoxyphenyl)-6-methoxy-7-(4-(2-hydroxycarbonylethyl)-carboxypipendin-1-yl)-13,13-dimethyl-3H,13H-indeno[2',3':3,4]naphtho[1,2-b]pyran; 3-phenyl-3-(4-(4-methoxyphenyl-piperazin-1-yl)phenyl)-13,13-dimethyl-6-methoxy-7-hydroxy-indeno [2',3':3,4]naphtho[1,2-b]pyran; 3-phenyl-3-(4-(4-methoxyphenyl-piperazin-1-yl)phenyl)-13,13-dimethyl-6-methoxy-7-(2-hydroxy-2-methyl-3-butyn-4-yl)-indeno[2',3':3,4]naphtho [1,2-b]pyran; 3-phenyl-3-(4-morpholinophenyl)-6-methoxy-7-(3-hydroxymethylene-piperidin-1-yl)-13,13-dimethyl-3H,13H-indeno[2',3':3,4]naphtho-[1,2-b]pyran; 3-phenyl-3-(4-morpholinophenyl)-6-methoxy-7-(3-(2-hydroxycarbonyl-ethyl)carboxymethylene-piperidin-1-yl)-13,13-dimethyl-3H,13H-indeno [2',3':3.4]-naphtho[1,2-b]pyran; 3-phenyl-3-(4-morpholinophenyl)-6-methoxy-7-(3-(2-hydroxycarbonylethyl)carboxymethylene-piperidin-1-yl)-13,13-dimethyl-3H,13H-indeno [2',3':3,4]naphtho[1,2-b]pyran; 3-phenyl-3-(4-morpholinophenyl)-6-methoxy-7-(4-hydroxypiperidin-1-yl)-13,13-dimethyl-3H,13H-indeno[2',3':3,4]naphtho[1.2-b]pyran; 3-phenyl-3-(4-morpholinophenyl)-6-methoxy-7-(4-(2-hydroxycarbonylethyl)-carboxypiperidin-1-yl)-13,13-dimethyl-3H,13H-indeno[2',3':3,4] naphtho[1.2-b]pyran; 3-phenyl-3-(4-morpholinophenyl)-6-methoxy-7-piperazinyl-13,13-dimethyl-3H,13H-indeno[2',3':3,4]naphtho[1.2-b]pyran; 3-phenyl-3-(4-morpholinophenyl)-6,11-dimethyl-13-hydroxy-13-(1-oxo-methoxyprop-2-yl)-1H-indeno[2,1-f]naphtho[1,2-b]pyran; 3-phenyl-3-(4-(4-phenylpiperazino)-phenyl)-6-methoxy-7-(4-hydroxypiperidin-1-yl)-13,13-dimethyl-3H,13H-indeno [2',3':3,4] naphtho[1.2-b]pyran; 3-phenyl-3-(4-(4-phenylpiperazino)phenyl)-6-methoxy-7-(4-(2-hydroxycarbonylethyl) carboxypiperidin-1-yl)-13,13-dimethyl-3H,13H-indeno[2',3':3,4] naphtho[1.2-b]pyran; 3-phenyl-3-(4-piperazinylphenyl)-6,11-dimethoxy-13,13-dimethyl-3H,13H-indeno[2',3':3,4]naphtho-[1,2-b]pyran; 3-phenyl-3-(4-piperazinylphenyl)-6-methoxy-7-piperidinyl-13,13-dimethyl-3H,13H-indeno[2',3':3,4]naphtho[1,2-b]pyran; 3-phenyl-3-(4-(3-methylpiperazin-1-yl)phenyl)-6-methoxy-7-(decahydroisoquinolin-2-yl)-11-tert-butyl-13,13-dimethyl-3H,13H-indeno[2',3':3,4]naphtho[1,2-b]pyran; 3-(4-methoxyphenyl)-3-(4-morpholinophenyl)-16-(ethoxycarnobyl)methyl-16-hydroxy-3,16-dihydrobenzofuro-[2',3':7,8] indeno[2',3':3,4]naphtho[1,2-b]pyran; 3-phenyl-3-(4-methoxyphenyl)-16-(ethoxycarnobyl)-methyl-16-hydroxy-3,16-dihydrobenzofuro [2",3":6',7']indeno-[3',2':4,3]naphtho[1,2-b]pyran; 3-phenyl-3-(4-morpholinophenyl)-16-(ethoxycarnobyl)-methyl-16-hydroxy-3,16-dihydrobenzofuro[2",3":6',7']indeno[3',2':4,3] naphtho[1,2-b]pyran; 3,3-di(4-methoxyphenyl)-16-(ethoxycarbonyl)methyl-16-hydroxy-3,16-dihydro-benzofuro[2',3':7,8]indeno[2',3':3,4] naphtho[1,2-b]pyran; 3,3-di(4-methoxyphenyl)-16-hydroxy-16-ethyl-16H-benzofuro[2',3':7,8] indeno[2',3':3,4]naphtho [1,2-b]

pyran; 3,3-di(4-methoxyphenyl)-16-hydroxy-16H-benzofuro [2",3":6,7]indeno [3',2':4,3]naphtho-[1,2-b] pyran; 3,3-di(4-methoxyphenyl)-16-hydroxy-16-ethyl-16H-benzofuro[2",3":6,7]-indeno[3',2':4,3]naphtho[1,2-b]pyran; 3-(4-methoxyphenyl)-3-(2,3-diydrobenzofur-5-yl)-13-hydroxy-13-methyl-indeno[2,1-f]naphtho[1,2-b] pyran; 3-(4-methoxyphenyl)-3-(2,3-dihydrobenzofur-5-yl)-6,11-difluoro-13-hydroxy-13-(1-oxo-methoxyprop-2-yl)-1H-indeno[2,1-f]naphtho[1,2-b]pyran, or a mixture thereof.

31. The method of embodiment 28 or 29, wherein the reactive photochromic compound is 2,2-di(4-fluorophenyl)-5-hydroxycarbonyl-6-phenyl-9-methoxy-2H-naphtho[1,2-b]pyran; 2,2-bis(4-methylphenyl)-5-methoxycarbonyl-6-hydroxy-2H-naphtho[1,2-b]pyran; 2,2-bis(4-methoxyphenyl)-5-methoxycarbonyl-6-hydroxy-[2H]-naphtho[1,2-b]pyran; 2,2-bis(4-methoxyphenyl)-5-methoxyethoxycarbonyl-6-methyl-8-vinyl-2H-naphtho[1,2-b]pyran; 2,2-bis(4-methoxyphenyl)-5-methoxyethoxycarbonyl-6-methyl-8-hydroxycarbonyl-2H-naphtho [1,2-b]pyran; 2,2-bis(4-methoxyphenyl)-5-methoxycarbonyl-6-(2-hydroxyethoxy)ethoxy-[2H]-naphtho[1,2-b]pyran; 2,2-bis(4-methoxyphenyl)-5-methoxycarbonyl-6-phenyl-9-(2-hydroxyethoxy)-[2H]-naphtho[1,2-b]pyran; 2,2-bis(4-methoxyphenyl)-5-methoxy-6-(4-(2-hydroxyethoxy)phenyl)-[2H]-naphtho[1,2-b]pyran; 2,2-bis(4-methoxyphenyl)-5-diphenylmethylol-6-hydroxy-2H-naphtho[1,2-b]pyran; 2,2-bis(4-methoxyphenyl)-5-diphenylmethylol-6-methoxy-2H-naphtho[1,2-b]pyran; 2,2-bis(4-methoxyphenyl)-5-(2-hydroxyethoxylcarbonyl)-6-phenyl-[2H]-naphtho[1,2-b]pyran; 2,2-bis(4-methoxyphenyl)-5-(2-(2-hydroxyethoxy)-ethoxycarbonyl)-6-phenyl-[2H]-naphtho[1,2-b]pyran; 2,2-bis(4-methoxyphenyl)-5-(2-(2-(2-hydroxyethoxy)ethoxy)-ethoxycarbonyl)-6-phenyl-[2H]-naphtho[1,2-b]pyran; 2,2-bis(4-methoxyphenyl)-5-(2-(2-(2-(2-hydroxyethoxy)ethoxy)-ethoxy)-ethoxycarbonyl)-6-phenyl-[2H]-naphtho[1,2-b]pyran; 2,2-bis(4-methoxyphenyl)-5-hydroxymethyl-6-methyl-9-methoxy-2H-naphtho[1,2-b]pyran; 2,2-bis(4-methoxyphenyl)-5-hydroxymethyl-6-phenyl-2H-naphtho[1,2-b]pyran; 2,2-bis(4-methoxyphenyl)-5-hydroxymethyl-6-methoxy-2H-naphtho[1,2-b]pyran; 2,2-bis(4-methoxyphenyl)-5-methoxycarbonyl-6-(3-aminophenyl)-2H-naphtho[1,2-b]pyran; 2,2-bis(4-methoxyphenyl)-2,5,7-trihydro-7-methylidine-5-oxo-furo-[3',4':3,4]naphtho[1,2-b]pyran; 2,2-bis(4-methoxyphenyl)-5-phenylthio-6-hydroxy-2H-naphtho[1,2-b]pyran; 3,3-di(4-methoxyphenyl)-13-hydroxy-13-methyl-indeno[2,1-f]naphtho[1,2-b]pyran; 3,3-di(4-methoxyphenyl)-9-methoxycarbonyl-8-(2-hydroxyethoxy)ethoxy-[3H]-naphtho[1,2-b]pyran; 2,2-diphenyl-5-hydroxycarbonyl-9-methoxy-2H-naphtho[1,2-b]pyran; 2,2-diphenyl-5-hydroxycarbonyl-8,9-dimethoxy-2H-naphtho[1,2-b]pyran; 2,2-diphenyl-5-hydroxy-6-carboethoxy-2H-naphtho[1,2-b]pyran; 2,2-diphenyl-5-hydroxy-6-morpholinocarbonyl-2H-naphtho[1,2-b]pyran; 2,2-diphenyl-5-hydroxy-6-carboethoxy-2H-naphtho[1,2-b]pyran; 2,2-diphenyl-5-hydroxy-6-carbomethoxy-9-methoxy-2H-naphtho[1,2-b]pyran; 2,2-diphenyl-5-hydroxy-6-morpholinocarbonyl-2H-naphtho[1,2-b]pyran; 2,2-diphenyl-5-methylol-6-(3-dimethylaminopropyl)methylamino-2H-naphtho[1,2-b]pyran; 2,2-diphenyl-2,5,7-trihydro-7-methyliden-5-oxofuro-[3',4':3,4]naphtho[1,2-b]pyran; 2,2-spiroadamantylene-5-phenylthio-6-hydroxy-2H-naphtho[1,2-b]pyran; 2,2-diphenyl)-5-methoxycarbonyl-6-hydroxy-2H-naphtho[1,2-b]pyran; 2,2-spiro-admamtylene-5-methoxycarbonyl-6-hydroxy-2H-naphtho[1,2-b]pyran, 3,3-diphenyl-8-hydroxy-9-carbopropoxy-3H-naphtho[2,1-b]pyran; 2,2,5-triphenyl-6-carboethoxy-2H-naphtho[1,2-b]pyran; 2,2,6-triphenyl-5-(2-(2-(2-(2-hydroxyethoxy)ethoxy)-ethoxy)ethoxy) carbonyl-[2H]-naphtho[1,2-b]pyran; 2,2,6-triphenyl-5-(2-(2-(2-oxiran-2-ylmethoxy)ethoxy)ethoxy)-ethoxycarbonyl)-[2H]-naphtho[1,2-b]pyran; 2-(4-methoxyphenyl)-2-(4-morpholinophenyl)-5-hydroxy-6-carboethoxy-2H-naphtho[1,2-b]pyran; 2-(4-methoxyphenyl)-2-tert-butyl-5-methoxy-carbonyl-6-hydroxy-2H-naphtho[1,2-b]pyran; 2-(4-methoxyphenyl)-2-phenyl-5-methoxycarbonyl-6-hydroxy-2H-naphtho[1,2-b]pyran; 2-(4-(2-(2-hydroxyethoxy)ethoxy)-ethoxyphenyl)-2-phenyl-5-methoxycarbonyl-6-methyl-9-methoxy-[2H]-naphtho[1,2-b]pyran; 2-(4-(2-(2-hydroxyethoxy)ethoxy)phenyl)-2-phenyl-5-methoxycarbonyl-6-(2-(2-methylprop-2-enoxyloxy) ethoxy)-[2H]-naphtho[1,2-b]pyran; 3-(4-(2-(2-hydroxyethoxy)-ethoxy)ethoxyphenyl)-3-phenyl-9-methoxycarbonyl-8-methoxy-[3H]-naptho[1,2-b]pyran; 2-(4-morpholinophenyl)-2-phenyl-5-methoxycarbonyl-6-hydroxy-2H-naphtho[1,2-b]pyran; 2-(9-ethylcarbazol-2-yl)-2-phenyl-5-methoxycarbonyl-6-hydroxy-2H-naphtho[1,2-b]pyran; 2-(9-phenylcarbazol-2-yl)-2-phenyl-5-methoxycarbonyl-6-hydroxy-2H-naphtho[1,2-b]pyran; 2-(4-dimethylaminophenyl)-2-phenyl-5-methoxycarbonyl-6-hydroxy-2H-naphtho[1,2-b]pyran; 3-(2-flurophenyl)-3-(4-methoxyphenyl-8-hydroxy-9-carbopropoxy-3H-naphtho[2,1-b]pyran; 3-(2-flurophenyl)-3-(4-methoxyphenyl-8-hydroxy-9-carbomethoxy-3H-naphtho[2,1-b]pyran; 3-(2,4-dimethoxyphenyl)-3-(4-methoxyphenyl-8-hydroxy-9-carbomethoxy-3H-naphtho[2,1-b]pyran; 3-(2,4,6-triflurophenyl)-3-(2,4,6-trimethoxy-1-naphthyl)-8-acetyl-9-carboniloyl-3H-naphtho[2,1-b]pyran; 3-(4-methoxyphenyl)-3-(2-methyl-2,3-dihydrobenzofur-5-yl)-6-methoxy-12-hydroxymethyl-11-phenyl-3H-phenanthro[1,2-b]pyran; 5,5-bis(4-methoxyphenyl)-8-methylol-5H-fluorantheno[3,2-b]pyran; or a mixture thereof.

32. The method of embodiment 28 or 29, wherein the reactive photochromic compound is 1-hydroxyethyl-3,3-dimethylspiro[indoline-2,3'-[3H]-naphtho[2,1-b][1,4]oxazine]; 1-hydroxypropyl-3,3-dimethylspiro[indoline-2,3'-[3H]-naphtho[2,1-b][1,4]oxazine]; 1-aminoethyl-3,3-dimethyl-5-chlorospiro[indoline-2,3'-[3H]-naphtho[2,1-b][1,4]oxazine]; 1-hydroxyethyl-3,3-dimethyl-8'-methoxyspiro[indoline-2,3'-[3H]-naphtho[2,1-b][1,4]oxazine]; 1-(p-vinylphenyl)-3,3-dimethyl-5,6-dichlorospiro[indoline-2,3'-[3H]-naphtho[2,1-b][1,4]oxazine]; 1,3,3-trimethyl-9'-hydroxyspiro[indoline-2,3'-[3H]-naphtho[2,1-b][1,4]oxazine]; 1,3,3-trimethyl-5'-hydroxymethylspiro[indoline-2,3'-[3H]-naphtho[2,1-b][1,4]oxazine]; 1,3,3-trimethyl-9'-aminospiro[indoline-2,3'-[3H]-naphtho[2,1-b][1,4]oxazine]; 1,3,3-trimethyl-5-chloro-8'-hydroxyspiro[indoline-2,3'-[3H]-naphtho[2,1-b][1,4]oxazine]; 1-benzyl-3,3-dimethyl-9'-vinylbenzoyloxyspiro[indoline-2,3'-[3H]-naphtho[2,1-b][1,4]oxazine]; 1-benzyl-3,3-dimethyl-5'-hydroxymethylpiperidinospiro-naphthooxazine; 1,3,3-trimethyl-9'-hydroxyspiro[indoline-2,3'-[3H]-pyrido-[2,1-b][1,4]benzooxazine]; 5-hydroxy-6'-cyano-1,3,3-trimethyl-spiro-[indoline-2,3'-[3H]-naphtho[2,1-b][1,4]oxazine]; 5-hydroxy-6'-phenylsulfonyl-1,3,3-trimethyl-spiro-[indoline-2,3'-[3H]-naphtho[2,1-b][1,4]oxazine]; 5'formyl-1,3,3-trimethylspiro[indoline-2,3'-[3H]-naphtho[2,1-b][1,4]oxazine; 1,3-dihydro-6'-piperazino-1,3,3- trimethyl spiro [2H indole-2,3'-[3H]-naphtho[2,1-b][1,4]oxazine; 1,3-dihydro-6'-(4-hydroxyethyl)piperazino-1,3,3-trimethyl spiro [2H indole-2,3'-[3H]-naphtho[2,1-b][1,4]oxazine; 1,3-dihydro-9'-hydroxy-1,3,3-trimethyl spiro 92H indole-2,3'-[3H]-naphtho[2,1-b][1,4] oxazine; 1,3,3,4,5-pentamethyl-9'-methoxycarbonyl-8'-hydroxy-spiro [indoline-2,3'-[3H]naphth[2,1-b][1,4]oxazine; 1,3,3,5,6-pentamethyl-9'-methoxycarbonyl-8'-hydroxy-spiro[indoline-2,3'-[3H]naphth[2,1-b][1,4]oxazine; 1-propyl-3,3,4,5-tetramethyl-9'-methoxycarbonyl-8'-hydroxy-spiro [indoline-2,3'-[3H]naphth[2,1-b][1,4]oxazine; 1-propyl-3,3,5,6-tetramethyl-9'-methoxycarbonyl-8'-hydroxy-spiro [indoline-2,3'-[3H]naphth[2,1-b][1,4]oxazine; 1-methoxyethyl-3,3-dimethyl-9'-allyloxycarbonyl-8'-chloroactoxy-spiro[indoline-2,3'-[3H]naphth[2,1-b][1,4]oxazine; 1-allyl-3,3-spirocyclohexyl-9'-benzyloxycarbonyl-8'-chloroactoxy-spiro[indoline-2,3'-[3H]naphth[2,1-b][1,4]oxazine; 5-amino-1,3,3-trimethyl-spiro[indoline-2,3'-[3H]-pyrido[3,4-f][1,4]benzoxazine; 6-hydroxy-1',3',3',4',5'-pentamethylspiro[2H-1,4-benzoxazine-2,2'-indoline]; 6-hydroxy-1',3',3',5',6'-pentamethylspiro[2H-1,4-benzoxazine-2,2'-indoline]; 5,7-dimethoxy-1'-hydroxycarbonylethyl-3',3'-dimethylspiro[2H-1,4-bezoxazine-2,2'-indoline]; 7-methoxy-1'-hydroxy-ethyl-3',3'-dimethylspiro[2H-1,4-bezoxazine-2,2'-indoline]; 9'-hydroxy-1-methylspiro[indoline-2,3'-(3H)-naphtho(2,1-b)-1,4-oxazine]; 5-chloro-9'-hydroxy-1-methylspiro[indoline-2,3'-(3H)-naphtho(2,1-b)-1,4-oxazine]; 8'-hydroxy-1-methylspiro[indoline-2,3'-(3H)-naphtho(2,1-b)-1,4-oxazine]; 8'-hydroxy-5-methoxy-1-methylspiro [indoline-2,3'-(3H)-naphtho(2,1-b)-1,4-oxazine]; 8'-hydroxy-1,4,5-trimethylspiro[indoline-2,3'-(3H)-naphtho(2,1-b)-1,4-oxazine]; 9'-hydroxy-1-isopropylspiro[indoline-2,3'-(3H)-naphtho(2,1-b)-1,4-oxazine]; 9'-hydroxy-1-hexadecyl-spiro[indoline-2,3'-(3H)-naphtho(2,1-b)-1,4-oxazine]; 9'-hydroxy-1-octadecylspiro[indoline-2,3'-(3H)-naphtho(2,1-b)-1,4-oxazine]; 1,1"-(1,5-pentanediyl)bis[3,3-dimethyl]-9'-hydroxy-spiro[indoline-2,3'-[3H]-naphtho[2,1-b] [1,4]oxazine]; 1,1"-[1,4-phenylenebis(methylene)]bis[3,3-dimethyl]-5'-hydroxymethylspiro[indoline-2,3'-[3H]-naphtho[2,1-b][1,4]oxazine]; 1,1"-(1,4-butanediyl)bis[5,6-dichloro-3,3-dimethyl]-8'-hydroxyspiro[indoline-2,3'-[3H]-naphtho[2,1-b] [1,4]oxazine]; 1,3,3-trimethyl-9'-hydroxypiperidinospironaphthooxazine; 3-carboxyethyl-1,1-dimethyl-9'-methoxyspiro[benz[e]-indoline-2,3'-[3H]-naphtho[2,1-b][1,4]oxazine]; 1-carboxyethyl-3,3-dimethyl-9'-methoxyspiro[benz[g]-indoline-2,3'-[3H]-naphtho[2,1-b][1,4]oxazine]; 1,1-dimethyl-3-hydroxyethyl-9'-methoxyspiro[benz[e]-indoline-2,3'-[3H]-naphtho[2,1-b][1,4]oxazine]; 3,3-dimethyl-1-hydroxyethyl-9'-methoxyspiro-[benz[g]-indoline-2,3'-[3H]-naphtho[2,1-b][1,4]oxazine]; 3-carboxyethyl-1,1-dimethyl-9'-methoxyspiro[benz[e]-indoline-2,3'-[3H]-pyrido[2,1-b][1,4]benzoxazine]; 1-carboxyethyl-3,3-dimethyl-9'-methoxyspiro[benz[g]-indoline-2,3'-[3H]-pyrido[2,1-b][1,4]benzoxazine]; 1,1-dimethyl-3-hydroxyethyl-9'-methoxyspiro[benz[e]-indoline-2,3'-[3H]-pyrido[2,1-b][1,4]benzoxazine]; 3,3-dimethyl-1-hydroxyethyl-9'-methoxyspiro[benz[g]-indoline-2,3'-[3H]-pyrido[2,1-b][1,4]benzoxazine]; 5-amino-5'-(2-benzthiazolyl)-1,3,3-trimethylspiro[indoline-2,3'-[3H]-naphtho[2,1-b][1,4]oxazine]; 5-amino-5'-(5'-(2-hydroxyphenyl)-2-oxadiazolyl)-1-isopropyl-3,3-dimethylspiro[indoline-2,3'-[3H]-naphtho[2,1-b][1,4]oxazine]; 5-amino-5'-(5'-phenyl-2-oxadiazolyl)-1,3,3-trimethylspiro[indoline-2,3'-[3H]-naphtho[2,1-b][1,4]oxazine]; or a mixture thereof.

33. The method of embodiment 28 or 29, wherein the reactive photochromic compound is 3,3-bis(4-methoxyphenyl)-6,11-dimethyl-13-hydroxyethoxy-13-phenyl-3H,13H-indeno [2',3':3,4]naphtho[1,2-b]pyran; 3,3-bis(4-methoxyphenyl)-6,11-dimethyl-13-(2-hydroxycarbonylethyl)carboxyethoxy-13-phenyl-3H,13H-indeno [2',3':3,4]naphtho[1,2-b]pyran; 3,3-bis(4-methoxyphenyl)-6,11-dimethyl-13-hydroxy-13-phenyl-3H,13H-indeno [2',3':3,4]naphtho[1,2-b]pyran; or a mixture thereof.

34. The method of any one of embodiments 1 to 33, wherein said at least one thermal free radical initiator is an azo-containing radical initiator.

35. The method of any one of embodiments 1 to 34, wherein the polymerizable composition comprises from about 15% to about 55% by weight of said at least one hydrophilic (meth)acrylamido monomer.

36. The method of any one of embodiments 1 to 34, wherein the polymerizable composition comprises from about 20% to about 50% by weight of said at least one hydrophilic (meth)acrylamido monomer.

37. The method of any one of embodiments 1 to 34, wherein the polymerizable composition comprises from about 20% to about 45% by weight of said at least one hydrophilic (meth)acrylamido monomer.

38. The method of any one of embodiments 1 to 34, wherein the polymerizable composition comprises from about 20% to about 40% by weight of said at least one hydrophilic (meth)acrylamido monomer.

39. The method of any one of embodiments 1 to 38, wherein the polymerizable composition comprises from about 5% to about 50% by weight of said at least one siloxane-containing (meth)acrylamido monomer.

40. The method of any one of embodiments 1 to 38, wherein the polymerizable composition comprises from about 5% to about 45% by weight of said at least one siloxane-containing (meth)acrylamido monomer.

41. The method of any one of embodiments 1 to 38, wherein the polymerizable composition comprises from about 10% to about 40% by weight of said at least one siloxane-containing (meth)acrylamido monomer.

42. The method of any one of embodiments 1 to 41, wherein the polymerizable composition comprises from about 5% to about 50% by weight of said at least one polysiloxane vinylic crosslinker.

43. The method of any one of embodiments 1 to 41, wherein the polymerizable composition comprises from about 10% to about 45% by weight of said at least one polysiloxane vinylic crosslinker.

44. The method of any one of embodiments 1 to 41, wherein the polymerizable composition comprises from about 10% to about 40% by weight of said at least one polysiloxane vinylic crosslinker.

45. The method of any one of embodiments 1 to 44, wherein the polymerizable composition comprises from about 0.05% to about 2.0% by weight of said at least one thermal free radical initiator, relative to the total weight of the polymerizable composition.

46. The method of any one of embodiments 1 to 44, wherein the polymerizable composition comprises from about 0.1% to about 1.75% by weight of said at least one thermal free radical initiator, relative to the total weight of the polymerizable composition.

47. The method of any one of embodiments 1 to 44, wherein the polymerizable composition comprises from about 0.15% to about 1.5% by weight of said at least one thermal free radical initiator, relative to the total weight of the polymerizable composition.

48. The method of any one of embodiments 1 to 44, wherein the polymerizable composition comprises from about 0.2% to about 1.25% by weight of said at least one thermal free radical initiator, relative to the total weight of the polymerizable composition.

49. The method of any one of embodiments 1 to 45, wherein the organic solvent has a boiling point that is higher than the second curing temperature but lower than 110° C.

50. The method of any one of embodiments 1 to 49, wherein the organic solvent is 1-propanol, isopropanol, sec-butanol, tert-butyl alcohol, tert-amyl alcohol, or combinations thereof.

51. The method of any one of embodiments 1 to 50, wherein the polymerizable composition comprises at least one UV-absorbing vinylic monomer and/or at least one UV/HEVL-Absorbing vinylic monomer.

52. The method of embodiment 51, wherein the polymerizable composition comprises 2-[2'-hydroxy-5'-(2-methacryloxyethyl)phenyl)]-2H-benzotriazole (Norbloc).

53. The method of any one of embodiments 1 to 52, wherein the polymerizable composition further comprise about 10% by weight or less of additional polymerizable components selected from the group consisting of one or more secondary hydrophilic vinylic monomers (i.e., hydrophilic vinylic monomers other than hydrophilic (meth)acrylamido monomer), one or more secondary siloxane-containing vinylic monomers (i.e., siloxane-containing vinylic monomers other than siloxane-containing acrylamido monomer), one or more hydrophobic vinylic monomers, one or more non-silicone vinylic crossliners, and combinations thereof.

54. The method of embodiment 53, wherein the polymerizable composition further comprise at least one secondary hydrophilic vinylic monomer which comprises:
    (1) a hydroxyl-containing (meth)acryloxy monomer selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, and combinations thereof;
    (2) a carboxyl-containing (meth)acryloxy monomer selected from the group consisting of (meth)acrylic acid, ethylacrylic acid, and combinations thereof;
    (3) an amino-containing (meth)acryloxy monomer selected from the group consisting of 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof;
    (4) an N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof;
    (5) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof;
    (6) a (meth)acryloxy monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, and combinations thereof;
    (7) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof;
    (8) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof;
    (9) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloyl-amino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)ethylphosphate, 2-((meth)acryloyloxy)ethyl-2'-(triethylammonio)-ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)-propyl-2'-(trimethylamrmonio)-ethylphosphate, 2-((meth)acryloyloxy)butyl-2'-(trimethyl-ammonio)ethylphosphate, 2-((meth)acryloyloxy)pentyl-2'-(trimethylaammonio)-ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethyl-ammonio)ethylphosphate, 2-(vinyloxycarbonyl)ethyl-2'-(trimethylammonio) ethyl phosphate, 2-(allyloxycarbonyl)ethyl-2'-(trimethylammonio)-ethylphosphate, 2-(vinylcarbonylamino) ethyl-2'-(trimethylammonio)ethylphosphate, 2-(allyloxycarbonyl-amino)ethyl-2'-(trimethylammonio)ethyl phosphate, 2-(butenoyloxy)ethyl-2'-(trimethylammonio)ethylphosphate, and combinations thereof;
  (10) allyl alcohol;
  (11) N-2-hydroxyethyl vinyl carbamate;
  (12) N-vinyloxycarbonyl-β-alanine (VINAL);
  (13) N-vinyloxycarbonyl-α-alanine; or
  (14) combinations thereof.

55. The method of embodiment 53 or 54, wherein the polymerizable composition further comprise at least one secondary siloxane-containing vinylic monomer which comprises at least one siloxane-containing vinylic monomer of formula (M1) or (M2):

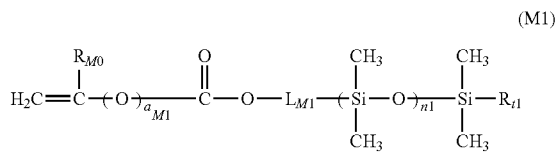

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

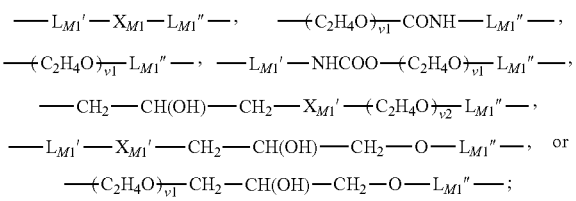

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

56. The polymerizable composition of any one of embodiments 53 to 55, wherein the polymerizable composition further comprise at least one secondary siloxane-containing vinylic monomer which comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

57. The polymerizable composition of any one of embodiments 53 to 56, wherein the polymerizable composition further comprise at least one non-silicone vinylic crosslinking agent selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis [oxy(2-hydroxypropane-1,3-diyl)] di-(meth)acrylate, bis [2-(meth)acryloxyethyl] phosphate, trimethylolpropane di-(meth)acrylate, 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-(meth)acrylamide, and combinations thereof.

58. The method of any one of embodiments 1 to 57, wherein the polymerizable composition is degassed to minimize the concentration of 02 in the polymerizable composition.

59. The method of any one of embodiments 1 to 58, wherein the step of curing thermally in the oven is carried out under $N_2$ or Ar atmosphere, wherein the $N_2$ or Ar environment in the oven is maintained by flowing $N_2$ or Ar through the oven at a first flow rate.

60. The method of embodiment 59, wherein the organic solvent has a boiling point of lower than 105° C., wherein the method further comprises, between steps (3) and (4), the steps of: raising oven temperature to a post-curing temperature of about 110° C. or higher while increasing the flow rate of nitrogen gas through the oven to a second flow rate which is at least about 2.0 folds of the first flow rate; and heating the lens mold with the unprocessed photochromic silicone hydrogel contact lens therewithin in the oven at the post-curing temperature under nitrogen gas flow through the oven at the second flow rate for at least about 30 minutes.

61. The method of embodiment 60, wherein the post-curing temperature is at least about 115° C.

62. The method of embodiment 60, wherein the post-curing temperature is at least about 120° C.

63. The method of any one of embodiments 60 to 62, wherein the second flow rate is at least about 3.0 folds of the first flow rate.
64. The method of any one of embodiments 60 to 62, wherein the second flow rate is at least about 4.0 folds of the first flow rate.
65. The method of any one of embodiments 60 to 64, wherein the lens mold with the unprocessed photochromic silicone hydrogel contact lens therewithin is heated in the oven at the post-curing temperature for at least about 60 minutes.
66. The method of any one of embodiments 60 to 64, wherein the lens mold with the unprocessed photochromic silicone hydrogel contact lens therewithin is heated in the oven at the post-curing temperature for at least about 90 minutes.
67. The method of any one of embodiments 60 to 64, wherein the lens mold with the unprocessed photochromic silicone hydrogel contact lens therewithin is heated in the oven at the post-curing temperature for at least about 120 minutes.
68. A photochromic silicone hydrogel contact lens obtained according to a method of any one of embodiments 1 to 67.
69. The photochromic silicone hydrogel contact lens of embodiment 60, having: an oxygen permeability of at least about 40 barrers (preferably at least about 60 barrers, more preferably at least about 80 barrers) (at about 35° C.); an elastic modulus of about 2.0 MPa or less (preferably about 1.5 MPa or less, more preferably about 1.2 or less, even more preferably from about 0.4 MPa to about 1.0 MPa) (at a temperature of from 22° C. to 28° C.); and/or a water content of from about 15% to about 70% (preferably from about 20% to about 50% by weight) (at a temperature of from 22° C. to 28° C.) when fully hydrated.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance.

Chemicals

CE-PDMS represents a polysiloxane vinylic crosslinker (Mw=10.1 K determined by $H^1$ NMR spectroscopy) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; TRIS-Am represents N-[tris (trimethylsiloxy)-silylpropyl]acrylamide; DMA represent N,N-dimethylacrylamide; Vazo-64 represents 2,2'-dimethyl-2,2'azodipropiononitrile; Norbloc is 2-[2'-hydroxy-5'-(2-methacryloxyethyl)phenyl)]-2H-benzotriazole from Aldrich; PrOH represents n-propanol.

Example 2

Preparation of Lens Formulations

A lens formulation is prepared to have the following composition: 10 parts by weight of PrOH; 32 parts by weight of DMA; 1.5 parts by weight of Norbloc; 28 parts by weight of TRIS-Am; 40 parts by weight of CE-PDMS (Mw=10.1K Daltons); 0.5 part by weight of Vazo-64; 0.8 part by weight of a first polymerizable naphthopyran photochromic dye (blue color in activated state) from Vivimed (designated as "NPD-blue"); 1.2 parts by weight of a second polymerizable naphthopyran photochromic dye (green color in activated state) from Vivimed (designated "NPD-green"). All components are added into a clean bottle, with a stir bar to mix at 600 rpm for 30 minutes at room temperature. After all the solid is dissolved, the formulation is filtered with a glass micro filter (2.7 µm GMF filter).

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds and thermally cured in an oven under the following curing profile: ramp from room temperature to 55° C.

at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes.

After de-molding, cast-molded SiHy contact lenses are extracted with PrOH for 180 minutes and then rinsed in PB (phosphate buffer containing about 0.077 wt. % $NaH_2PO_4$—$H_2O$ and about 0.31 wt. % $Na_2HPO_4$-$2H_2O$) for 1 hour.

FIG. 1 shows the activating and fading (deactivating) kinetics of photochromic SiHy contact lenses prepared above (transmittance monitored at 550 nm).

Figure 2:
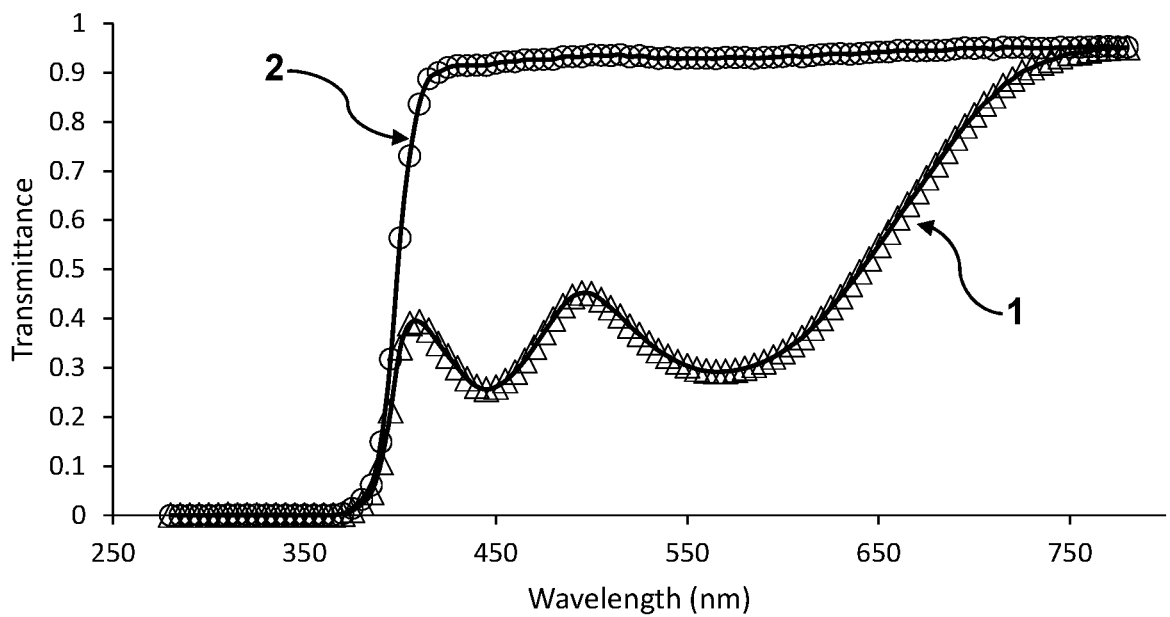
FIG. 2 shows the UV-Vis transmission spectra of a photochromic SiHy contact lens at "on" (activated) state—Curve 1 and "off" (deactivated) state—Curve 2.

FIG. 2 shows the transmission spectra of photochromic SiHy contact lenses prepared above in activated ("on") and deactivated ("off") states.

Example 3

Preparation of Lens Formulations

A lens formulation is prepared to have the following composition: 5 parts by weight of PrOH; 33 parts by weight of DMA; 34 parts by weight of TRIS-Am; 34 parts by weight of CE-PDMS (Mw=10.1K Daltons); 0.5 part by weight of Vazo-64; 0.8 part by weight of a first polymerizable naphthopyran photochromic dye (blue color in activated state) from Vivimed (designated as "NPD-blue"); 1.2 parts by weight of a second polymerizable naphthopyran photochromic dye (green color in activated state) from Vivimed (designated "NPD-green"). All components are added into a clean bottle, with a stir bar to mix at 600 rpm for 30 minutes at room temperature. After all the solid is dissolved, the formulation is filtered with a glass micro filter (2.7 μm GMF filter).

Lens Fabrication

Lenses are prepared by cast-molding from a lens formulation prepared. The lens formulation is purged with nitrogen at room temperature for 30 minutes. The $N_2$-purged lens formulation is introduced into polypropylene molds and thermally cured in an oven under one of the three curing profiles shown in Table 1.

After de-molding, cast-molded SiHy contact lenses are extracted with PrOH for 180 minutes and then rinsed in PB (phosphate buffer containing about 0.077 wt. % $NaH_2PO_4$—$H_2O$ and about 0.31 wt. % $Na_2HPO_4$-$2H_2O$) for 1 hour. The metrolgy of obtained photochromic SiHy contact lenses are determined by using a metrology device (J&L Metrology). The metrology data are also reported in Table 1. The lens properties, including elastic modulus (E'), elongation at break (% EtB), equilibrium water content (EWC), and oxygen permeability (Dk) of the photochromic SiHy contact lenses are also determined and reported in Table 1.

The lens properties of photochromic SiHy contact lenses obtained according to curing profiles I to III are determined according to the procedures described in Example 1 and reported in Table 1. The results shows that the photochromic SiHy contact lenses obtained according to curing profiles I and II can have a higher oxygen permeability, higher elongation at break, similar lens diameters, similar BCs, and EWCs, compared to those obtained according to curing profile III.

When the three groups of lenses obtained according to three different curing profiles are also tested for % blocking by UV-Vis in their "on" and "off" state, no significant differences are observed.

All the publications and patents which have been cited herein above are hereby incorporated by reference in their entireties.

What is claimed is:

1. A method for producing silicone hydrogel photochromic contact lenses, comprising the steps of:
   (1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (2) introducing a polymerizable composition into the cavity, wherein the polymerizable composition comprises
      (a) at least one hydrophilic (meth)acrylamido monomer,
      (b) at least one siloxane-containing (meth)acrylamido monomer,
      (c) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonyl-amino groups, vinyloxycarbonyloxy groups, or combinations thereof,
      (d) at least one photochromic compound,
      (e) at least one thermal free radical initiator having a 10-hour half-life temperature (designated as $T_{10h\lambda}$) of from about 50° C. to about 90° C., and
      (f) from about 4% to about 20% by weight of an organic solvent relative to the total weight of the polymerizable composition,
         wherein the sum of the amounts of components (a) to (c) is at least 90% by weight relative to total amount of all polymerizable components in the polymerizable composition;

TABLE 1

|  | I | II | III |
|---|---|---|---|
| Curing Profile | $N_2$-purge 30 minutes<br>55° C. 40 minutes<br>80° C. 40 minutes<br>100° C. 40 minutes | $N_2$-purge 30 minutes<br>65° C. 30 minutes<br>100° C. 30 minutes | $N_2$-purge 30 minutes<br>80° C. 60 minutes |
| Lens Diameter (mm) | 14.076 ± 0.008 | 14.002 ± 0.064 | 13.674 ± 0.064 |
| BC* (mm) | 8.297 ± 0.026 | 8.209 ± 0.039 | 8.006 ± 0.059 |
| E' (MPa) | 0.67 ± 0.01 | 0.62 ± 0.01 | 0.62 ± 0.00 |
| % EtB | 426 ± 180 | 450 ± 62 | 399 ± 8 |
| EWC (% by weight) | 28.92% | 28.78% | 30.26% |
| Dk (barrers) | 141 ± 4 | 141 ± 3 | 137 ± 4 |

*BC—base curve which is the back curvature of photochromic SiHy contact lens.

(3) curing thermally the polymerizable composition in the lens mold in an oven to form an unprocessed photochromic silicone hydrogel lens precursor, wherein the step of curing thermally comprises
　(a) maintaining a first curing temperature of from about $(T_{10h\lambda}-20°)$ C. to about $T_{10h\lambda}°$ C. for a first curing time,
　(b) maintaining a second curing temperature of from about $(T_{10h\lambda}+10°)$ C. to about $(T_{10h\lambda}+35)°$ C. for a second curing time, and
　(c) optionally maintaining a third curing temperature of about 100° C. for a third curing time; and
(4) subjecting the unprocessed photochromic silicone hydrogel lens precursor to one or more post-molding processes selected from the group consisting of extraction, surface treatment, hydration, packaging, sterilization, and combinations thereof, to form a photochromic silicone hydrogel contact lens.

2. The method of claim 1, wherein the step of curing thermally comprises (c) maintaining a third curing temperature of about 100° C. for a third curing time.

3. The method of claim 2, wherein said at least one photochromic compound comprises a naphthopyran, an indeno-fused naphthopyran, a heterocyclic ring-fused naphthopyrian, a benzopyran, a phenanthropyran, a quinopyran, a quinolinopyran, a fluoroanthenopyran, an anthracene-fused pyran, a tetracene-fused pyran, a spiro(benzindoline)naphthopyran, a spiro(indoline)naphthopyran, a spiro(indoline)benzopyran, a spiro(indoline)quinopyran, a spiro(indoline)pyran, a naphthoxazine, a spirobenzopyran, a spirobenzothiopyran, a naphthacenedione, a benzoxazine, a spirooxazine, a naphthoxazine, a spiro(benzindoline)naphthoxazine, a spiro(indoline)naphthoxazine, a spiro(indoline) pyrido-benzoxazine, a spiro(indoline)benzoxazine, a spiro (benzindoline) benzoxazine, a spiro(benzindoline) pyridobenzoxazine, a spiro(indoline) fluoranthenoxazine, a spiro(indoline)-quinoxazine, a spiropiperidine-naphthopyran, a piro(indoline)pyronobenzoxazinone, a benzospiropyran, a naphthospiropyran, a spirobenzoxazine-pyrrolopyridine, a spironaphthoxazine-pyrrolopyrridine, a spiro-oxazepin-benzoxazine, a spiro-oxazepin-naphthoxazine, a spiro(indoline) benzothiazoloxazine, a spiro(indoline)benzopyrroloxazine, a spiro(indoline)quinazolino-oxazine, a spiro(indoline)-anthracenobenzoxazine, a benzofurobenzopyran, a benzothienobenzopyran, a naphthofurobenzopyran, a benzopyrano-fused naphthopyran, a spiro(isoindoline)-naphthoxazine, a spiro(isoindoline)benzoxazine, or a mixture thereof.

4. The method of claim 3, wherein said at least one photochromic compound is polymerizable and comprises an ethylenicaly-unsaturated group.

5. The method of claim 4, wherein said at least one thermal free radical initiator is an azo-containing radical initiator.

6. The method of claim 5, wherein the polymerizable composition comprises: from about 15% to about 55% by weight of said at least one hydrophilic (meth)acrylamido monomer; from about 5% to about 50% by weight of said at least one siloxane-containing (meth)acrylamido monomer; from about 5% to about 50% by weight of said at least one polysiloxane vinylic crosslinker; from about 0.05% to about 2.0% by weight of said at least one thermal free radical initiator; or combinations thereof, relative to the total weight of the polymerizable composition.

7. The method of claim 6, wherein the organic solvent has a boiling point that is higher than the second curing temperature but lower than 110° C.

8. The method of claim 7, wherein the organic solvent is 1-propanol, isopropanol, sec-butanol, tert-butyl alcohol, tert-amyl alcohol, or combinations thereof.

9. The method of claim 7, wherein the polymerizable composition comprises at least one UV-absorbing vinylic monomer and/or at least one UV/HEVL-absorbing vinylic monomer.

10. The method of claim 9, wherein the polymerizable composition comprises 2-[2'-hydroxy-5'-(2-methacryloxyethyl)phenyl)]-2H-benzotriazole.

11. The method of claim 8, wherein the polymerizable composition comprises at least one UV-absorbing vinylic monomer and/or at least one UV/HEVL-absorbing vinylic monomer.

12. The method of claim 11, wherein the polymerizable composition comprises 2-[2'-hydroxy-5'-(2-methacryloxyethyl)phenyl)]-2H-benzotriazole.

13. The method of claim 7, wherein the polymerizable composition is degassed to minimize the concentration of $O_2$ in the polymerizable composition.

14. The method of claim 7, wherein the step of curing thermally in the oven is carried out under $N_2$ or Ar atmosphere, wherein the $N_2$ or Ar atmosphere in the oven is maintained by flowing $N_2$ or Ar through the oven at a first flow rate.

15. The method of claim 14, wherein the organic solvent has a boiling point of lower than 105° C., wherein the method further comprises, between steps (3) and (4), the steps of: raising oven temperature to a post-curing temperature of about 110° C. or higher while increasing the flow rate of nitrogen gas through the oven to a second flow rate which is at least about 2.0 times of the first flow rate; and heating the lens mold with the unprocessed photochromic silicone hydrogel contact lens therewithin in the oven at the post-curing temperature under nitrogen gas flow through the oven at the second flow rate for at least about 30 minutes.

16. The method of claim 8, wherein the polymerizable composition is degassed to minimize the concentration of 02 in the polymerizable composition.

17. The method of claim 8, wherein the step of curing thermally in the oven is carried out under $N_2$ or Ar atmosphere, wherein the $N_2$ or Ar atmosphere in the oven is maintained by flowing $N_2$ or Ar through the oven at a first flow rate.

18. The method of claim 17, wherein the organic solvent has a boiling point of lower than 105° C., wherein the method further comprises, between steps (3) and (4), the steps of: raising oven temperature to a post-curing temperature of about 110° C. or higher while increasing the flow rate of nitrogen gas through the oven to a second flow rate which is at least about 2.0 times of the first flow rate; and heating the lens mold with the unprocessed photochromic silicone hydrogel contact lens therewithin in the oven at the post-curing temperature under nitrogen gas flow through the oven at the second flow rate for at least about 30 minutes.

\* \* \* \* \*